(12) United States Patent
Adachi

(10) Patent No.: US 11,035,420 B2
(45) Date of Patent: Jun. 15, 2021

(54) TRANSMISSION

(71) Applicant: HONDA MOTOR CO., LTD., Tokyo (JP)

(72) Inventor: Jun Adachi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 22 days.

(21) Appl. No.: 16/368,050

(22) Filed: Mar. 28, 2019

(65) Prior Publication Data

US 2019/0301540 A1 Oct. 3, 2019

(30) Foreign Application Priority Data

Mar. 30, 2018 (JP) .............................. JP2018-068940

(51) Int. Cl.
*F16D 23/08* (2006.01)
*F16D 11/14* (2006.01)
(Continued)

(52) U.S. Cl.
CPC .............. *F16D 23/08* (2013.01); *F16D 11/14* (2013.01); *F16D 23/14* (2013.01); *F16H 63/14* (2013.01);
(Continued)

(58) Field of Classification Search
CPC .......... F16D 23/08; F16D 11/14; F16D 23/14; F16D 2011/002; F16D 2023/141;
(Continued)

(56) References Cited

U.S. PATENT DOCUMENTS 3,079,806 A * 3/1963 Jones .................. F16H 63/3009
74/335
3,788,157 A * 1/1974 Carlson ................... F16H 63/30
74/364

(Continued)

FOREIGN PATENT DOCUMENTS

CN          105276173 A      1/2016
DE  10 2007 062 307 A1      6/2009
(Continued)

OTHER PUBLICATIONS

Machine language translation of 10-0815705.*
(Continued)

*Primary Examiner* — Mark A Manley
(74) *Attorney, Agent, or Firm* — Carrier Blackman & Associates, P.C.; William D. Blackman; Joseph P. Carrier

(57) ABSTRACT

The transmission includes a rotation shaft, a shift gear, and a gear switching part. The shift gear is rotatably supported by the rotation shaft. The gear switching part is relatively unrotatably supported by the rotation shaft in a movable manner in an axial direction. The gear switching part is configured to be moved in the axial direction by a shift fork, to switch connection and disconnection between the rotation shaft and the shift gear. The gear switching part and the shift fork have a bearing therebetween. The bearing is brought into contact with the gear switching part and the shift fork, thereby reducing friction between the gear switching part and the shift fork, resulting in improvement of durability of the sliding surfaces of the gear switching part and the shift fork.

15 Claims, 15 Drawing Sheets

(51) Int. Cl.
*F16D 23/14* (2006.01)
*F16H 63/32* (2006.01)
*F16H 63/14* (2006.01)
*F16H 63/30* (2006.01)
*F16D 11/00* (2006.01)
*F16H 63/18* (2006.01)

(52) U.S. Cl.
CPC ........ *F16H 63/32* (2013.01); *F16D 2011/002* (2013.01); *F16D 2023/141* (2013.01); *F16H 2063/3093* (2013.01); *F16H 2063/324* (2013.01)

(58) Field of Classification Search
CPC .................... F16D 23/06; F16D 11/10; F16D 2023/0618–0693; F16H 63/32; F16H 63/14; F16H 2063/3093; F16H 2063/324; F16H 63/18; F16H 3/006; F16H 3/093; F16H 2200/006; B60Y 2200/12
See application file for complete search history.

(56) References Cited

U.S. PATENT DOCUMENTS

| 5,052,986 | A | * | 10/1991 | Jarchow ................. F16D 23/06 |
| | | | | 192/114 T |
| 6,085,607 | A | | 7/2000 | Narita et al. |
| 2007/0277635 | A1 | | 12/2007 | Komori |

FOREIGN PATENT DOCUMENTS

| DE | 10 2010 006 424 A1 | | 8/2011 |
| JP | 54144582 A | | 11/1979 |
| JP | S55-066009 A | | 5/1980 |
| JP | S56-113921 U | | 9/1981 |
| JP | S60-76422 U | | 5/1985 |
| JP | 3853926 B2 | | 12/2006 |
| JP | 2007-321820 A | | 12/2007 |
| JP | 2008-089067 A | | 4/2008 |
| JP | 2016-191460 A | | 11/2016 |
| KR | 10-0815705 | * | 3/2008 |

OTHER PUBLICATIONS

First Examination Report (FER), dated Dec. 9, 2019, issued in the corresponding Indian Patent Application No. 201914010178.
Office Action dated Nov. 5, 2019 issued in a corresponding Japanese Patent Application No. 2018-068940.

* cited by examiner

TRANSMISSION

BACKGROUND

1. Technical Field

The present invention relates to a transmission having a gear switching mechanism.

2. Description of the Background

A transmission may have a sleeve as a gear switching part of a gear switching mechanism. The sleeve may be provided with a groove for a shift fork, and the sleeve may be made to move in an axial direction of the sleeve by engaging the shift fork with the groove. Such an existing technique is disclosed in Patent Literature 1.

In the transmission having such a structure, the groove of the sleeve and the shift fork generate friction therebetween, thereby decreasing a power transmission efficiency and durability of sliding surfaces of the groove and the shift fork.

CITATION LIST

Patent Literature

Patent Literature 1: Japanese Unexamined Patent Application Laid-Open No. 2016-191460

BRIEF SUMMARY

An object of the present invention is to provide a transmission that causes less friction between a gear switching part of a gear switching mechanism and a shift fork, thereby having an improved power transmission efficiency and an improved durability at sliding surfaces of the gear switching part and the shift fork.

The present invention solves the above problems and provides a transmission including a rotation shaft, a shift gear, and a gear switching part. The shift gear is rotatably supported by the rotation shaft. The gear switching part is relatively unrotatably supported by the rotation shaft in a movable manner in an axial direction. The gear switching part is configured to be moved in the axial direction by a shift fork, thereby switching connection and disconnection between the rotation shaft and the shift gear. The shift fork and the gear switching part have a bearing therebetween. The bearing is brought into contact with the shift fork and the gear switching part.

This structure reduces friction between the shift fork and the gear switching part, resulting in improvement of a power transmission efficiency and an improvement of durability of contact surfaces of the shift fork and the gear switching part.

This structure may also include a synchronizer having a hub, a sleeve, and a blocking ring. The hub is relatively unrotatably supported by the rotation shaft while movement in the axial direction is inhibited. The sleeve is supported by the hub in a movable manner in the axial direction while relative rotation is inhibited. The blocking ring is disposed between the shift gear and the sleeve. The shift gear has gear dog teeth. The blocking ring has ring teeth that are disposed between sleeve teeth of the sleeve and the gear dog teeth. The sleeve is configured to move to make an inner circumferential surface of the blocking ring come into contact with a protruding cylindrical part of the shift gear, whereby the sleeve synchronizes with the shift gear. The gear switching part may use the sleeve, and the connection and the disconnection between the rotation shaft and the shift gear may be switched by connecting and disconnecting the sleeve teeth of the sleeve to and from the gear dog teeth of the shift gear.

In the synchronizing operation of the synchronizer, when the sleeve teeth of the sleeve push aside the ring teeth of the blocking ring and enter between the gear dog teeth of the shift gear, the sleeve receives a rotation force in a direction opposite to the rotation direction of the sleeve due to a reaction force of the shift gear. In addition, a relatively great force is required to push the sleeve into the shift gear, and this also increases the friction between the shift fork and the sleeve. Nevertheless, the transmission having the synchronizer with the above-described structure causes less friction between the shift fork and the sleeve in operating the synchronizer, thereby having an improved durability at the contact surfaces of the shift fork and the sleeve.

In the above-described structure, the bearing may be disposed between a thrust surface of the shift fork and a thrust surface of the sleeve, and the bearing may include a shift fork-side contact member and a sleeve-side contact member that are relatively rotatable. The shift fork-side contact member is brought into contact with the shift fork, whereas the sleeve-side contact member is brought into contact with the sleeve.

This structure further reduces friction between the sleeve and the shift fork due to relative rotation of each of the shift fork-side contact member and the sleeve-side contact member of the bearing, thereby improving durability of the contact surfaces of the sleeve and the shift fork.

In the above-described structure, the sleeve may have at least one open end in the axial direction.

This structure enables fitting a ring-shaped bearing to an outer circumference of the sleeve from the open end side of the sleeve, thereby making the assembling easy.

In the above-described structure, the shift fork may include a recessed groove that opens to the sleeve, and the sleeve may include a protrusion that protrudes in a radial direction to be inserted into the recessed groove. In this case, the bearing is disposed between a thrust surface of the protrusion of the sleeve and a thrust surface of the recessed groove.

This structure enables fitting the ring-shaped bearing into the recessed groove of the shift fork after the ring-shaped bearing is brought into contact with the thrust surface at each side of the protrusion of the sleeve, thereby making the assembling easy.

In the above-described structure, the sleeve may include a rim that protrudes in a radial direction at an end other than the open end, a first bearing may be disposed in contact with the rim, a second bearing may be disposed on a side opposite to the first bearing across the shift fork in the axial direction, and a retainer may be disposed on a side opposite to the shift fork across the second bearing in the axial direction to inhibit the second bearing from moving in the axial direction away from the shift fork.

In this structure, after the ring-shaped first bearing is assembled to the sleeve in contact with the rim of the sleeve, and the ring-shaped second bearing is further assembled to the sleeve, the second bearing is inhibited from moving in the axial direction away from the shift fork by the retainer. Thus, the assembling of the bearing is easy.

In the above-described structure, the bearing may be disposed between a radial surface of the shift fork and a radial surface of the sleeve, the bearing may include a shift fork-side contact member, which is brought into contact with the shift fork, and a sleeve-side contact member, which is brought into contact with the sleeve, and the shift fork-side contact member and the sleeve-side contact member may be made relatively rotatable.

This structure further reduces friction between the sleeve and the shift fork due to relative rotation of the shift fork-side contact member and the sleeve-side contact member of the bearing, thereby improving durability of sliding surfaces of the sleeve and the shift fork.

In the above-described structure, the shift fork may include a fork-side recessed groove that opens to the sleeve, the sleeve may include a raised part that protrudes in a radial direction, and a retainer may be disposed at a position separated from the raised part in the axial direction. In this case, the shift fork-side contact member is fitted into the fork-side recessed groove, and the sleeve-side contact member is held by the raised part and the retainer.

In this structure, the sleeve is moved in the axial direction by the shift fork primarily via the ball bearing, whereby the sleeve and the shift fork do not tend to directly slide with each other. Thus, friction between the sleeve and the shift fork is further reduced, resulting in improvement of durability of the contact surfaces of the sleeve and the shift fork.

In the above-described structure, the sleeve and the hub may be disposed between two shift gears in the axial direction, and protruding cylindrical parts of the shift gears may extend toward the hub. In this case, when the sleeve is at a neutral position, the bearing is disposed at a position to overlap the protruding cylindrical part in the axial direction.

In this structure, the two shift gears respectively have the protruding cylindrical parts that extend toward the hub, thereby having a space in the axial direction therebetween. Thus, the bearing is disposed without thinning the shift fork by arranging the bearing so as to overlap the protruding cylindrical part in the axial direction.

The transmission according to the present invention causes less friction between the groove of the gear switching part of the gear switching mechanism and the shift fork, thereby having an improved power transmission efficiency and an improved durability at the sliding surfaces of the groove and the shift fork.

DETAILED DESCRIPTION

A transmission T of a power unit P according to a first embodiment of the present invention will be described with reference to the attached drawings.

In descriptions in this specification and in claims, a front-rear direction, a left-right direction, and an up-down direction represent directions relative to a vehicle in a condition in which a power unit according to the present invention is mounted on a vehicle, in particular, a motorcycle. The drawings show arrows FR, RE, RH, LH, UP, and DW, which represent a front direction, a rear direction, a right-hand direction, a left-hand direction, an upward direction, and a downward direction, respectively.

Figure 1:
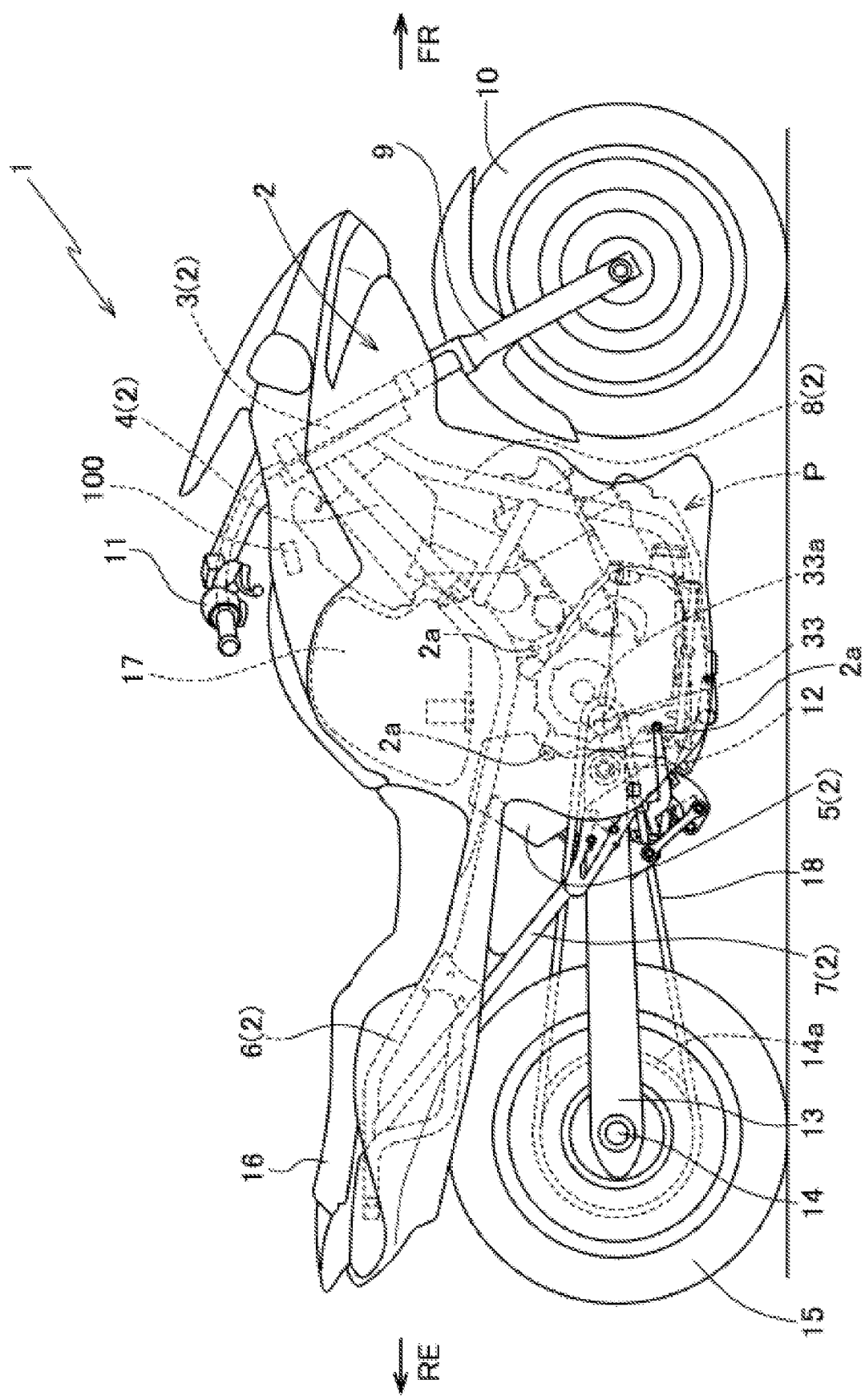
FIG. 1 is a right side view of a motorcycle mounted with a power unit using a transmission of an embodiment of the present invention.

FIG. 1 shows a motorcycle 1 having a body frame 2. The body frame 2 includes a head tube 3, a main frame member 4, a center frame member 5, a seat stay 6, a middle stay 7, and a down frame 8. The head tube 3 is disposed on a front part of the body frame 2. The main frame member 4 obliquely extends rearward downward from the head tube 3, bends at a midway part, and further extends rearward. The center frame member 5 extends downward from a rear end of the main frame member 4. The seat stay 6 extends from an upper part of the center frame member 5 in the rear direction. The middle stay 7 is disposed between a rear part of the center frame member 5 and a rear part of the seat stay 6. The down frame 8 extends downward from the head tube 3.

The head tube 3 steerably supports a front fork 9 that rotatably supports a front wheel 10 at a lower end part. The front fork 9 is connected to a steering handlebar 11 at an upper end part. The center frame member 5 swingably supports a swing arm 13 via a pivot shaft 12. The swing arm 13 rotatably supports a rear wheel 15 at a rear end via a rear wheel shaft 14.

The seat stay 6 has a passenger seat 16 that is mounted thereover. The passenger seat 16 has a fuel tank 17 in front thereof, and the fuel tank 17 is mounted over the main frame member 4.

The motorcycle 1 is mounted with the power unit P in which a rotation axis of a crankshaft 23 is directed in a left-right direction. The power unit P operates for driving the rear wheel 15. The power unit P has an output shaft 33 to which a driving sprocket 33a is fitted. The rear wheel shaft 14 has a driven sprocket 14a that is fitted thereto. The driving sprocket 33a and the driven sprocket 14a have an endless chain 18 that is stretched therebetween.

The power unit P is supported at a front part, a center upper part, a rear upper part, and a rear lower part by multiple engine hangers 2a that are provided to the body frame 2. The engine hanger 2a that supports the rear lower part of the power unit P is positioned under an even-numbered stage shaft 32, which is described later.

Figure 2:
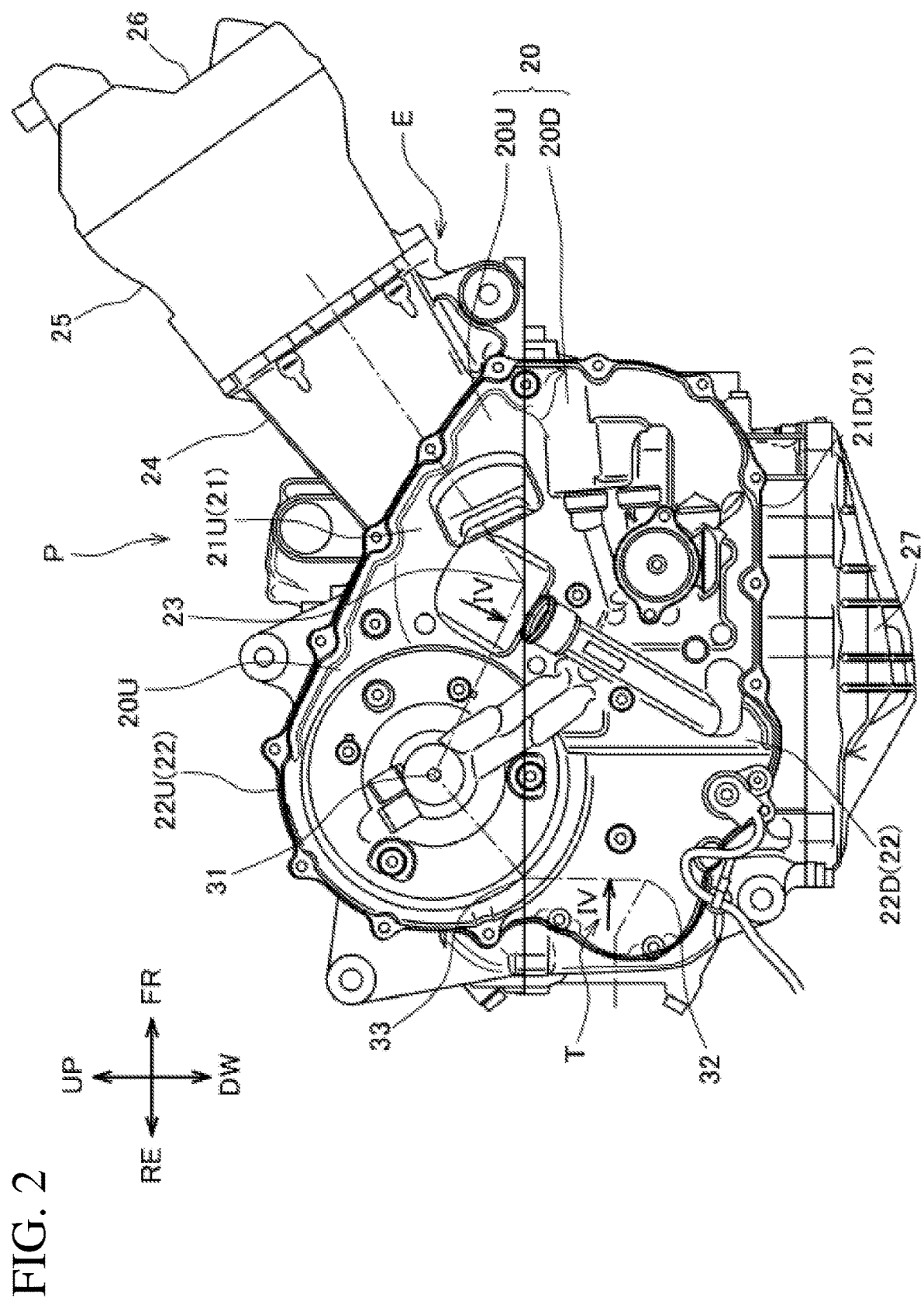
FIG. 2 is a right side view of the power unit.

As shown in FIG. 2, the power unit P includes a water-cooled, 2-cylinder, 4-stroke cycle internal-combustion engine (hereinafter called "internal-combustion engine") E and a transmission T that are combined together. The transmission T is connected to the rear of the internal-combustion engine E. The transmission T performs a gear shift operation under control of a gear shift control system 100 that is mounted on the motorcycle 1. The internal-combustion engine E is provided with an engine speed measuring unit 101 that measures a number Ne of rotation of the engine. The measured number Ne of rotation of the engine is sent to the gear shift control system 100.

The power unit P includes an unit case 20 that has a crankcase 21 as a front half part and a transmission case 22 as a rear half part, which are integrally formed in the front-rear direction. The crankcase 21 rotatably supports the crankshaft 23. The transmission case 22 houses a transmission mechanism 30 of the transmission T. The unit case 20 is constituted of upper and lower divided parts: an upper unit-case half part 20U and a lower unit-case half part 20D. The upper unit-case half part 20U includes an upper crankcase half part 21U and an upper transmission-case half part 22U, which are integrally formed. The lower unit-case half part 20D includes a lower crankcase half part 21D and a lower transmission-case half part 22D, which are integrally formed.

The upper crankcase half part 21U has an upper part on which a cylinder block 24, a cylinder head 25, and a head cover 26 are sequentially stacked in an oblique upward direction toward the front direction so as to protrude in a forward tilting manner.

The lower unit-case half part 20D has a lower side that is closed with an oil pan 27.

Figure 6:
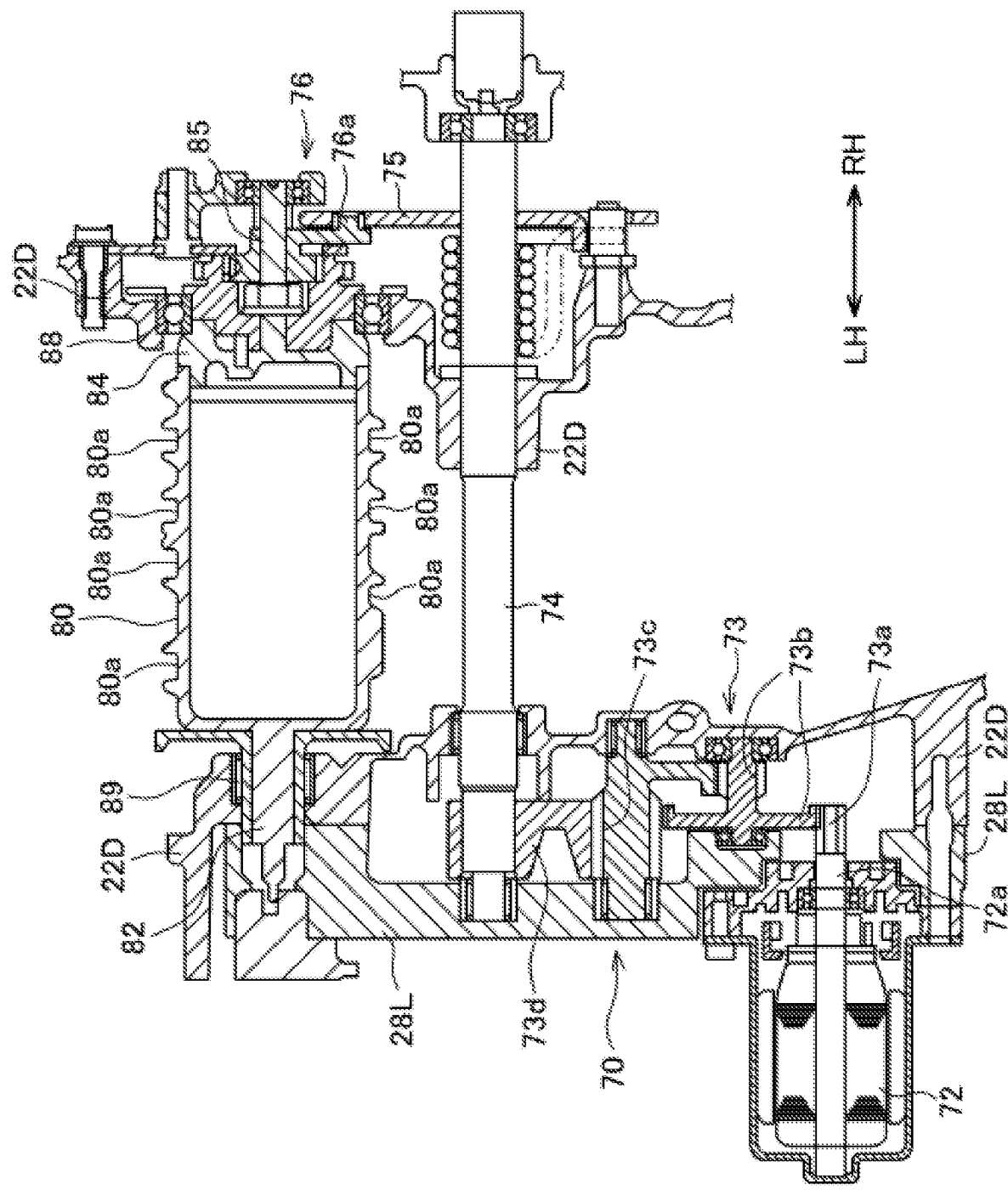
FIG. 6 is a sectional view of the periphery of a transmission.

The unit case 20 has a right side that is covered with a right unit-case cover 28R and has a left side that is covered with a left unit-case cover 28L (refer to FIG. 6).

The crankshaft 23 is held by the upper crankcase half part 21U and the lower crankcase half part 21D via bearings, which are not shown, thereby being rotatably supported by the crankcase 21.

Figure 4:
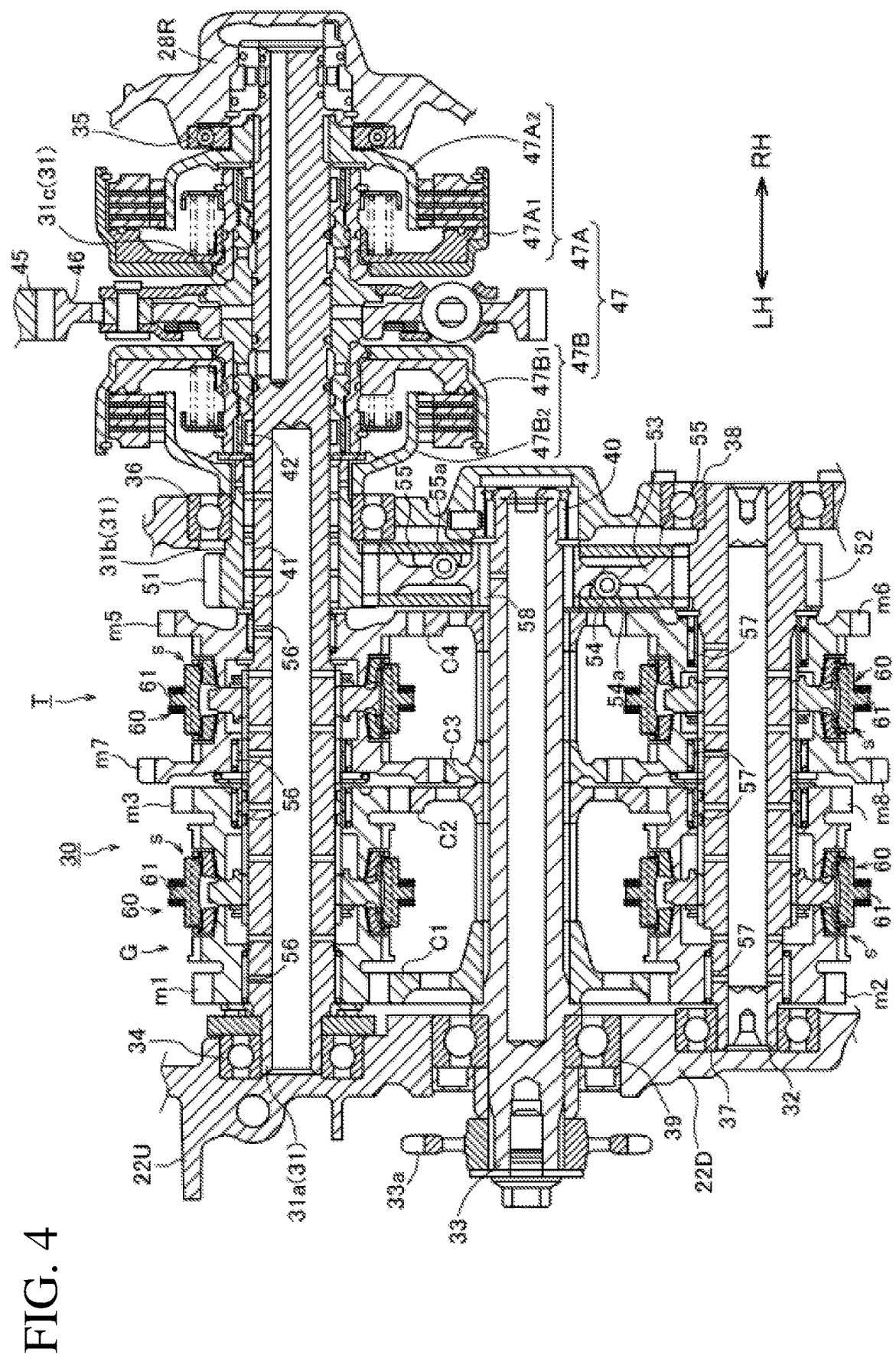
FIG. 4 is a sectional view taken along a line IV-IV in FIG. 2.
Figure 5:
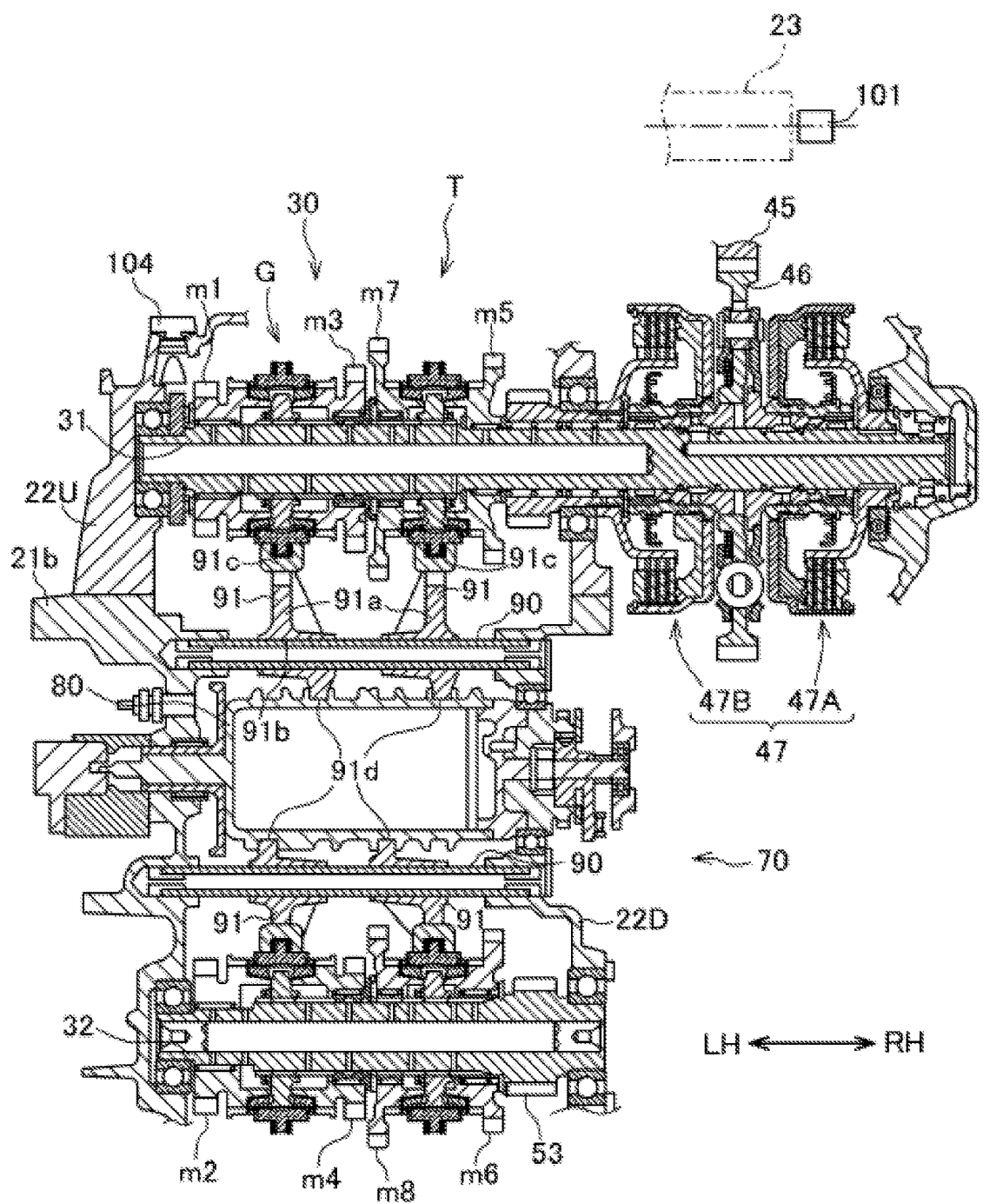
FIG. 5 is a sectional view taken along a line V-V in FIG. 3.

As shown in FIGS. 4 to 6, the transmission T that transmits a driving force of the internal-combustion engine E to a shifted gear of a predetermined speed stage includes a constant-mesh transmission mechanism 30, a gear shift operation mechanism 70, and a clutch unit 47. The gear shift operation mechanism 70 controls speed stages of the transmission mechanism 30. The clutch unit 47 has a first clutch 47A and a second clutch 47B, which is generally called a twin clutch. The transmission T is configured to have 8 forward speed stages.

As shown in FIGS. 4 and 5, the transmission mechanism 30 of the transmission T includes an odd-numbered stage shaft 31, an even-numbered stage shaft 32, the output shaft 33, and a gear group G. The odd-numbered stage shaft 31 is an input shaft and is disposed with driving gears m1, m3, m5, and m7 of odd-numbered stages. The even-numbered stage shaft 32 receives a rotational driving force from the odd-numbered stage shaft 31 and is disposed with driving gears m2, m4, m6, and m8 of even-numbered stages. The output shaft 33 has driven gears c1 to c4 with which the driving gears m1 to m8 of the odd-numbered stages and the even-numbered stages respectively mesh. The gear group G has the driving gears m1 to m8 of the odd-numbered stages and the even-numbered stages and the driven gears c1 to c4. The odd-numbered stage shaft 31, the even-numbered stage shaft 32, the output shaft 33, a shift drum 80, and a shift fork shaft 90 are disposed in parallel to the crankshaft 23 and are directed in the left-right direction. The shift drum 80 and the shift fork shaft 90 are described later.

Figure 3:
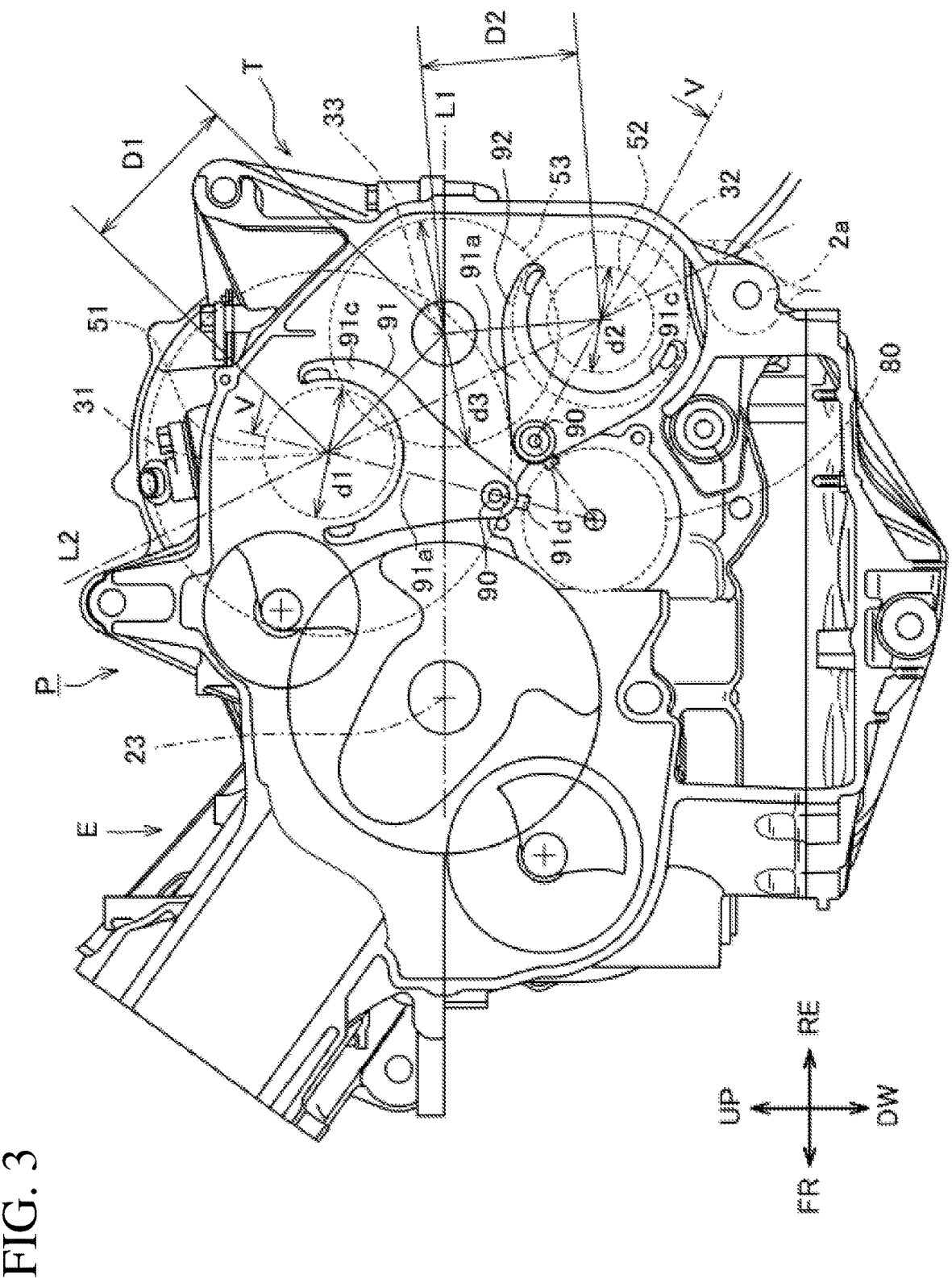
FIG. 3 is a left side view of the power unit of which an unit case cover is removed.

FIG. 3 shows the crankshaft 23, the odd-numbered stage shaft 31, the even-numbered stage shaft 32, and the shift drum 80 as viewed from a side of the vehicle. The output shaft 33 is disposed rearward of the crankshaft 23. The odd-numbered stage shaft 31 and the even-numbered stage shaft 32 are disposed rearward of the crankshaft 23. In addition, the odd-numbered stage shaft 31 is provided on a side opposite to the even-numbered stage shaft 32 relative to a line L1 connecting the crankshaft 23 and the output shaft 33. The shift drum 80 is disposed on a side opposite to the output shaft 33 relative to a line L2 connecting the odd-numbered stage shaft 31 and the even-numbered stage shaft 32. One or both of the odd-numbered stage shaft 31 and the even-numbered stage shaft 32 are disposed between the crankshaft 23 and the output shaft 33 in the front-rear direction of the vehicle. In this embodiment, the odd-numbered stage shaft 31 is disposed between the crankshaft 23 and the output shaft 33. The odd-numbered stage shaft 31, the even-numbered stage shaft 32, and the output shaft 33 are arranged so that a center distance D1 between the odd-numbered stage shaft 31 and the output shaft 33 will be longer than a center distance D2 between the even-numbered stage shaft 32 and the output shaft 33.

As shown in FIG. 3, the odd-numbered stage shaft 31 is disposed rearward of the crankshaft 23 in an oblique upward direction, to the upper transmission-case half part 22U. As shown in FIG. 4, the odd-numbered stage shaft 31 includes an odd-numbered stage main shaft 31a, a power-transmission outer shaft 31b, and a clutch outer shaft 31c. The odd-numbered stage main shaft 31a receives a rotational driving force from the crankshaft 23 via the first clutch 47A. The power-transmission outer shaft 31b is relatively rotatably disposed to cover an approximately center of the odd-numbered stage main shaft 31a and transmits a rotational driving force to the even-numbered stage via the second clutch 47B. The clutch outer shaft 31c is relatively rotatably supported on a right end side of the odd-numbered stage main shaft 31a, in adjacent to the power-transmission outer shaft 31b. The odd-numbered stage shaft 31 is provided with an odd-numbered stage shaft rotation sensor 104 that measures a number of rotation of the odd-numbered stage shaft 31.

The odd-numbered stage main shaft 31a has a left end that is rotatably supported by the upper transmission-case half part 22U via a ball bearing 34 and has a right end that is rotatably supported by the right unit-case cover 28R via a ball bearing 35. The odd-numbered stage main shaft 31a has the driving gears m1, m3, m7, and m5 of the odd-numbered stages, in this order from the left side, which are relatively rotatably mounted via respective needle bearings 56.

The power-transmission outer shaft 31b is relatively rotatably supported at a part from the center toward the right end side of the odd-numbered stage main shaft 31a via a needle bearing 41. The power-transmission outer shaft 31b has a right end, to which an inner clutch 47B₂ of the second clutch 47B is relatively unrotatably fitted, and has a left end, to which a transmitting gear 51 is integrally formed to transmit power to the even-numbered stage shaft 32.

The clutch outer shaft 31c is rotatably supported at a part from the power-transmission outer shaft 31b toward the outside in the right direction of the odd-numbered stage main shaft 31a via a needle bearing 42. The clutch outer shaft 31c has a center to which a primary driven gear 46 is relatively unrotatably fitted. The primary driven gear 46 meshes with a primary driving gear 45 that is fitted to the crankshaft 23. The primary driven gear 46 is disposed between the first clutch 47A, which is arranged on a right side, and the second clutch 47B, which is arranged on a left side.

The first clutch 47A has an outer clutch 47A₁. The second clutch 47B has an outer clutch 47B₁. These outer clutches 47A₁ and 47B₁ are respectively fitted to the clutch outer shaft 31c in an integrally rotatable manner. The first clutch 47A has an inner clutch 47A₂ that is spline-fitted to the odd-numbered stage main shaft 31a. The second clutch 47B has the inner clutch 47B₂ that is spline-fitted to the power-transmission outer shaft 31b.

The crankshaft 23 supplies a rotational driving force, which is reduced at a predetermined reduction ratio by the primary driving gear 45 and the primary driven gear 46 and is transmitted to the clutch outer shaft 31c. The rotational driving force that is transmitted to the clutch outer shaft 31c is transmitted to the odd-numbered stage main shaft 31a or the power-transmission outer shaft 31b, in response to selective connection of the first clutch 47A and the second clutch 47B, which is performed by an oil-hydraulic circuit (not shown).

The output shaft 33 receives power from the transmission T. The output shaft 33 is disposed rearward of the crankshaft 23 while being held between the upper transmission-case half part 22U and the lower transmission-case half part 22D. The output shaft 33 is rotatably supported by the transmission case 22 in the condition in which a left end passes through a ball bearing 39, and a part on the left end side and a right end are held between the upper transmission-case half part 22U and the lower transmission-case half part 22D, respectively via a ball bearing 39 and a needle bearing 40. The left end of the output shaft 33 is inserted into a driving sprocket 33a.

The power-transmission outer shaft 31b of the odd-numbered stage shaft 31 is relatively rotatably supported by the odd-numbered stage main shaft 31a via the needle bearing 41. The power-transmission outer shaft 31b is integrally formed with the transmitting gear 51 that is adjacently disposed on a left side of a ball bearing 36. The transmitting gear 51 transmits power from the odd-numbered stage shaft 31 to the even-numbered stage shaft 32. The power-transmission outer shaft 31b has a right end that is spline-fitted to the inner clutch 47B₂ of the second clutch 47B, whereby power from the crankshaft 23 is transmitted and is shut off by the second clutch 47B.

The even-numbered stage shaft 32 has a transmitted gear 52 that is provided on a right end side. The transmitted gear 52 integrally rotates with the even-numbered stage shaft 32. The right end of the output shaft 33 relatively rotatably supports an idle gear 53 via a needle bearing 58. The idle gear 53 meshes with each of the transmitting gear 51 and the transmitted gear 52.

As shown in FIG. 4, the idle gear 53 has a left side to which a first scissors gear 54 is relatively rotatably fitted. The first scissors gear 54 has a diameter approximately the same as an outer diameter of the idle gear 53. The first scissors gear 54 meshes with the transmitting gear 51 and is urged by a spring 54a in a direction opposite to a rotation direction of the transmitting gear 51.

The idle gear 53 has a right side to which a second scissors gear 55 is relatively rotatably fitted. The second scissors gear 55 has a diameter approximately the same as the outer diameter of the idle gear 53. The second scissors gear 55 meshes with the transmitted gear 52 and is urged by a spring 55a in a rotation direction of the idle gear 53.

The idle gear 53 of the output shaft 33 constantly meshes with the transmitting gear 51 of the power-transmission outer shaft 31b of the odd-numbered stage shaft 31 and also constantly meshes with the transmitted gear 52 of the even-numbered stage shaft 32. When the second clutch 47B is connected, a rotational driving force of the crankshaft 23 is transmitted to the even-numbered stage shaft 32, via the second clutch 47B, the transmitting gear 51 of the power-transmission outer shaft 31b, the idle gear 53, and the transmitted gear 52. At this time, the first scissors gear 54, which is provided at the left side of the idle gear 53, prevents backlash between the transmitting gear 51 and the idle gear 53, whereas the second scissors gear 55, which is provided at the right side of the idle gear 53, prevents backlash between the idle gear 53 and the transmitted gear 52. This structure reduces rattle noise that is generated between gears at the time of shifting to the even-numbered stage.

The gear group G that is provided to the transmission T has the following structure.

The four driving gears of the odd-numbered stages: the driving gear m1 with a gear ratio for a first speed, the driving gear m3 with a gear ratio for a third speed, the driving gear m7 with a gear ratio for a seventh speed, and the driving gear m5 with a gear ratio for a fifth speed, in this order from the left side, are respectively relatively rotatably supported by the odd-numbered stage main shaft 31a of the odd-numbered stage shaft 31 via the respective needle bearings 56.

The four driving gears of the even-numbered stages: the driving gear m2 with a gear ratio for a second speed, the driving gear m4 with a gear ratio for a fourth speed, the driving gear m8 with a gear ratio for an eighth speed, and the driving gear m6 with a gear ratio for a sixth speed, in this order from the left side, are respectively relatively rotatably supported by the even-numbered stage shaft 32 via respective needle bearings 57.

The four driven gears: the driven gears c1, c2, c3, and c4, are provided to the output shaft 33, in this order from the left side. These driven gears c1 to c4 are respectively spline-fitted to the output shaft 33 and are respectively integrally rotates with the output shaft 33.

The driving gear m1 of the odd-numbered stage shaft 31 and the driving gear m2 of the even-numbered stage shaft 32 are paired and, both constantly mesh with the driven gear c1 of the output shaft 33. Similarly, the driving gears m3, m7, and m5 of the odd-numbered stage shaft 31 are respectively paired with the driving gears m4, m8, and m6 of the even-numbered stage shaft 32, and the paired driving gears respectively constantly mesh with the driven gears c2, c3, and c4.

As shown in FIG. 4, the odd-numbered stage main shaft 31a of the odd-numbered stage shaft 31 is provided with a sleeve 61 that is positioned between the driving gear m1 for the first speed and the driving gear m3 for the third speed and also between the driving gear m7 for the seventh speed and the driving gear m5 for the fifth speed. The sleeve 61 is included in a gear switching mechanism 60. The sleeve 61 is slidable on the odd-numbered stage shaft 31 in the axial direction and is selectively engaged with the adjacent driving gear m1, m3, m5, or m7 via a synchronizer S.

The even-numbered stage shaft 32 is also provided with a sleeve 61 that is positioned between the driving gear m2 for the second speed and the driving gear m4 for the fourth speed and also between the driving gear m8 for the eighth speed and the driving gear m6 for the sixth speed. The sleeve 61 is included in a gear switching mechanism 60. The sleeve 61 is slidable on the even-numbered stage shaft 32 in the axial direction and is selectively engaged with the adjacent driving gear m2, m4, m6, or m8 via a synchronizer S.

Figure 7:
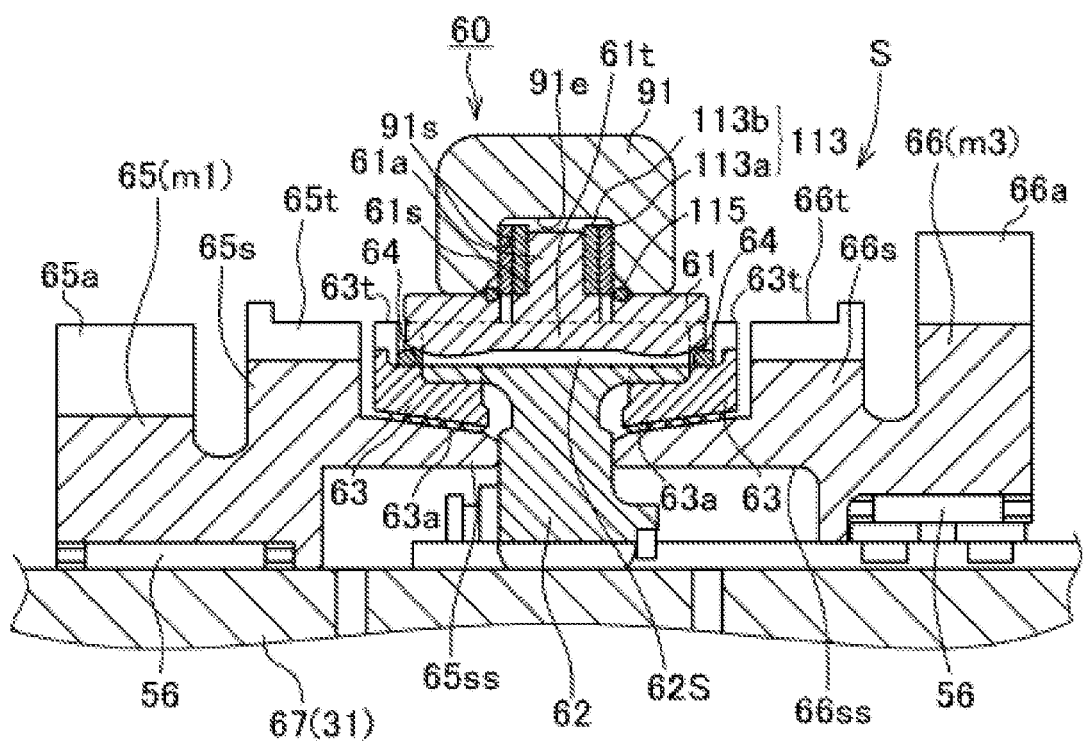
FIG. 7 is a sectional view of the periphery of a gear switching mechanism.
Figure 8:
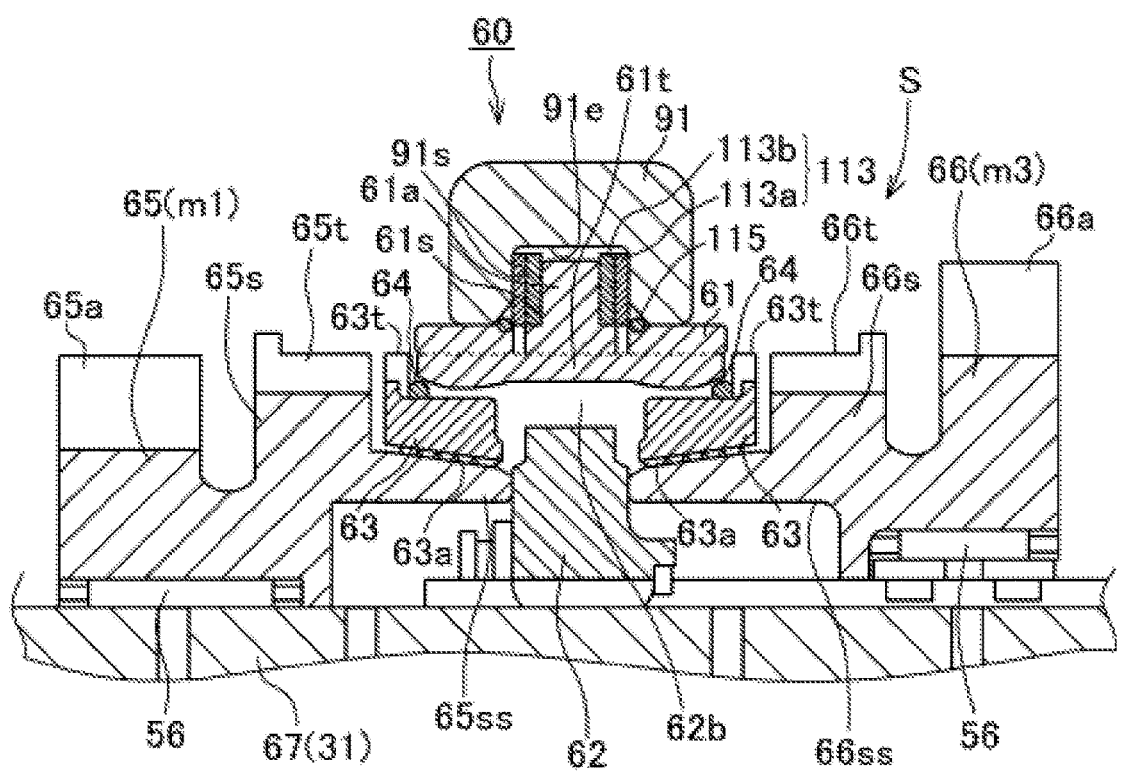
FIG. 8 is a sectional view of the periphery of the gear switching mechanism.

As shown in FIGS. 5, 7, and 8, the sleeve 61 engages with a shift fork 91 and is made to move in the axial direction by the shift fork 91.

As described below, the sleeve 61 is supported by a circular hub 62 in a movable manner in the axial direction while relative rotation is inhibited. The hub 62 is unrotatably supported by a rotation shaft 67 while movement in the axial direction is inhibited. In more detail, the sleeve 61 is supported by the hub 62 in the movable manner in the axial direction in the condition in which sleeve teeth 61t that are formed on an inner circumferential surface of the sleeve 61 engage with spline teeth 62s that are formed on an outer circumferential surface of the hub 62.

The shift fork 91 has an inner circumferential surface on which a recessed groove 91e is formed along the circumferential direction. The recessed groove 91e opens to the sleeve 61. The sleeve 61 has an outer circumferential surface on which a protrusion 61a is formed along the circumferential direction. The protrusion 61a is inserted into the recessed groove 91e of the shift fork 91.

The protrusion 61a of the sleeve 61 has a thrust surface 61s. The recessed groove 91e of the shift fork 91 also has a thrust surface 91s. The thrust surface 61s and the thrust surface 91s have a bearing 113 therebetween. The bearing 113 is composed of washers 113a and 113b. The washer 113a is a shift fork-side contact member that is brought into contact with the shift fork 91, whereas the washer 113b is a sleeve-side contact member that is brought into contact with the sleeve 61.

The washer 113b and the washer 113a are successively fitted to the sleeve 61 so that the bearing 113 will be brought into contact with each side of the protrusion 61a of the sleeve 61. The fitted washers 113a and 113b are secured by positioning rings 115 and are inserted into the recessed groove 91e of the shift fork 91. The washers 113a and 113b are relatively rotatable, thereby reducing friction between the sleeve 61 and the shift fork 91.

The gear switching mechanism 60 of the present invention includes the synchronizer S. The synchronizer S is provided between each of the sleeves 61 and the driving gear that is to be engaged with the corresponding sleeve 61. Each of the synchronizers S establishes the corresponding speed stage while synchronizing the sleeve 61 with the driving gear.

The gear switching mechanism 60 and the synchronizer S, which are provided between the driving gear m1 for establishing the first speed stage and the driving gear m3 for establishing the third speed stage, among the driving gears for establishing the speed stages, will be described with reference to FIGS. 7 and 8.

The structures of these gear switching mechanism 60 and synchronizer S also apply to the other gear switching mechanisms 60 and synchronizers S, respectively.

As shown in FIGS. 7 and 8, a shift gear 65 that is represented by the driving gear m1 for the first speed and a shift gear 66 that is represented by the driving gear m3 for the third speed are rotatably supported by a rotation shaft 67 via the needle bearings 56. The rotation shaft 67 corresponds to the odd-numbered stage shaft 31 in this embodiment.

The shift gear 65 has shift gear teeth 65a on an outer circumference as driving gear teeth for the first speed. The shift gear 65 also has gear dog teeth 65t formed on an outer circumference of a cylindrical part 65s that protrudes toward the shift gear 66, which represents the driving gear m3 for the third speed. The cylindrical part 65s, which has the gear dog teeth 65t on the outer circumference, also has a protruding cylindrical part 65ss that is formed by protruding an inner peripheral part.

The shift gear 66 has shift gear teeth 66a on an outer circumference as driving gear teeth for the third speed. The shift gear 66 also has gear dog teeth 66t formed on an outer circumference of a cylindrical part 66s that protrudes toward the shift gear 65, which represents the driving gear m1 for the first speed. The cylindrical part 66s, which has the gear dog teeth 66t on the outer circumference, also has a protruding cylindrical part 66ss that is formed by protruding an inner peripheral part.

The sleeve 61 is spline-fitted to an outer circumferential surface of a hub 62 so as to be movable, in a slidable manner, in the axial direction. The hub 62 is spline-fitted to the odd-numbered stage main shaft 31a while movement in the axial direction is inhibited. The hub 62 includes spline teeth 62s that are formed on an outer circumferential surface. The spline teeth 62s engage with sleeve teeth 61t that are formed on an inner circumferential surface of the sleeve 61. Among the multiple spline teeth 62s that are formed on the outer circumferential surface of the hub 62, the spline teeth 62s at an interval of 120 degrees in the circumferential direction are cut off to form three cut-off grooves 62b.

The sleeve teeth 61t are circularly arrayed on the inner circumferential surface of the sleeve 61 and are respectively tapered at each end.

The protrusion 61a that engages with the shift fork 91 is formed on the outer circumference of the sleeve 61 along the circumferential direction.

The protruding cylindrical part 65ss of the shift gear 65 and the sleeve 61 have a blocking ring 63 and a synchronizing spring 64 that are disposed therebetween. Similarly, the protruding cylindrical part 66ss of the shift gear 66 and the sleeve 61 have a blocking ring 63 and a synchronizing spring 64 that are disposed therebetween. The blocking ring 63 is formed with ring teeth 63t that have a diameter approximately the same as the diameter of the gear dog teeth 65t of the shift gear 65 and the diameter of the gear dog teeth 66t of the shift gear 66.

In establishing the speed stage, the sleeve 61 that engages with the shift fork 91 is slid to the shift gear 66 by the gear shift operation mechanism 70, from a neutral state as shown in FIG. 7. Thus, the sleeve 61 comes into contact with a left surface of the synchronizing spring 64, and the blocking ring 63 comes into contact with a right surface of the synchronizing spring 64, to start synchronizing of the sleeve 61.

This synchronizing operation of the synchronizer S will be described with reference to FIGS. 9A to 9G.

Figure 9:
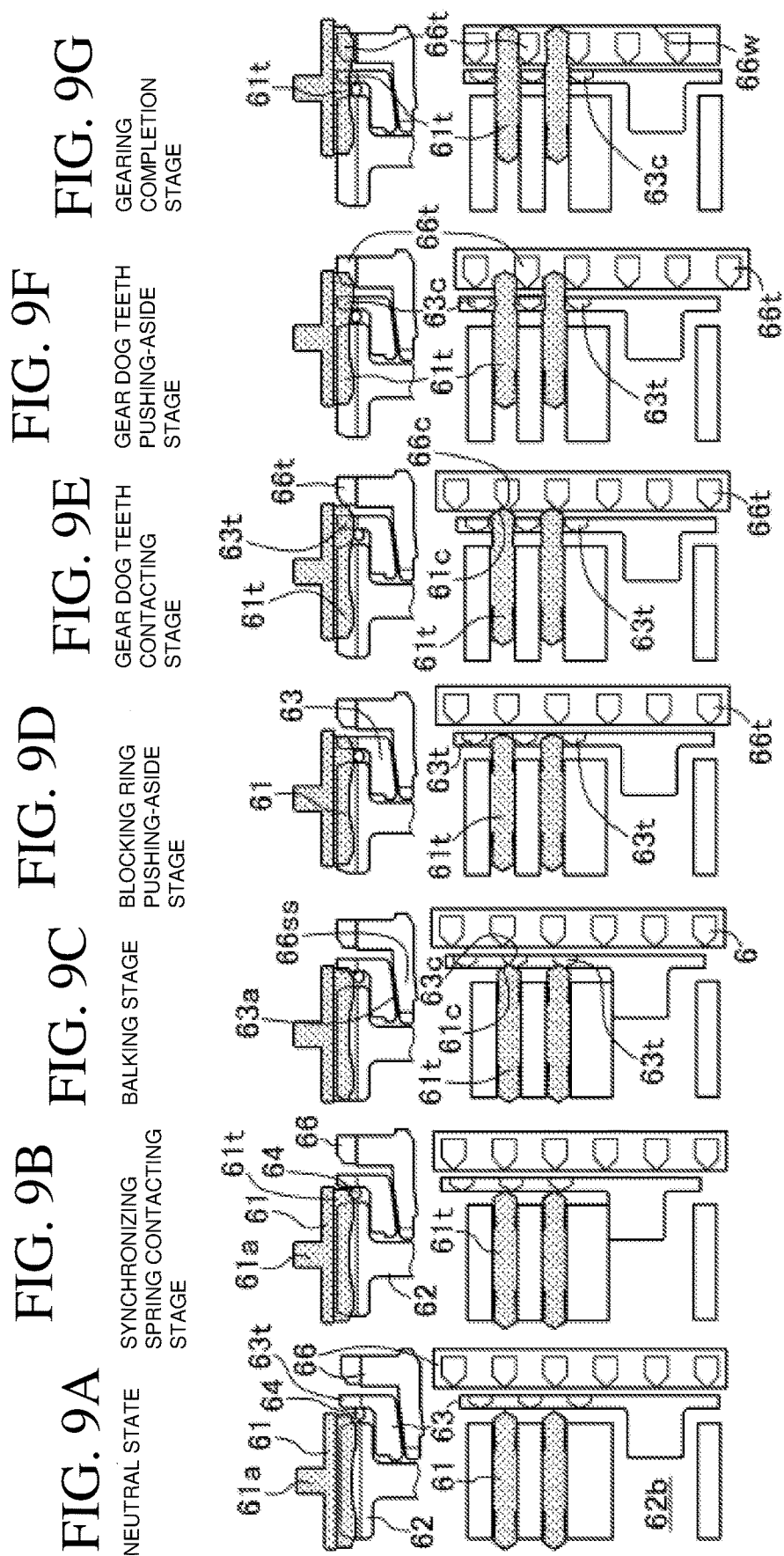
FIGS. 9A to 9G are schematic drawings showing a synchronizing operation of a synchronizer in time sequence.

FIG. 9A shows a neutral state before shifting of the gears is started. In the neutral state, the sleeve 61 is at a neutral position, and the sleeve teeth 61t are not in contact with the synchronizing springs 64 in the left-right direction and thereby do not start the synchronizing operation.

After the shifting of the gears is started, the sleeve 61 moves in the right direction. As shown in FIG. 9B, the sleeve teeth 61t of the sleeve 61 come into contact with the synchronizing spring 64 and is able to press the blocking ring 63 toward the shift gear 66 via the synchronizing spring 64. This movement is in a synchronizing spring contacting stage.

When the sleeve 61 further moves in the right direction, as shown in FIG. 9C, the blocking ring 63 is pressed toward the shift gear 66, and a frictional force is generated between an inner circumferential surface 63a of the blocking ring 63 and the protruding cylindrical part 66ss of the shift gear 66. Meanwhile, tips of the sleeve teeth 61t come into contact with tips of the ring teeth 63t, and then, chamfered surfaces 61c of the sleeve teeth 61t come into contact with chamfered surfaces 63c of the ring teeth 63t, whereby synchronization is started. This movement is in a balking stage.

Then, when the sleeve 61 further moves in the right direction, as shown in FIG. 9D, the sleeve teeth 61t mesh with the ring teeth 63t by pushing the ring teeth 63t aside, which results in integral rotation of the sleeve 61 and the blocking ring 63. This movement is in a blocking ring pushing-aside stage.

When the sleeve 61 further moves in the right direction, as shown in FIG. 9E, the tips of the sleeve teeth 61t come into contact with tips of the gear dog teeth 66t of the shift gear 66, and then, the chamfered surfaces 61c of the sleeve teeth 61t come into contact with chamfered surfaces 66c of the gear dog teeth 66t. This movement is in a gear dog teeth contacting stage.

When the sleeve 61 further moves in the right direction, as shown in FIG. 9F, the sleeve teeth 61t mesh with the gear dog teeth 66t by pushing the gear dog teeth 66t aside, resulting in completion of the synchronization. This movement is in a gear dog teeth pushing-aside stage.

When the sleeve 61 further moves in the right direction, as shown in FIG. 9G, the sleeve teeth 61t completely mesh with the gear dog teeth 66t, whereby the sleeve 61, including the odd-numbered stage shaft 31, and the shift gear 66, integrally rotate. This movement is in an in-gear stage.

The synchronizer S operates as described above, thereby engaging the sleeve 61 with the shift gear 66 while synchronizing them with each other.

Next, the gear shift operation mechanism 70 for moving the sleeve 61 of the gear switching mechanism 60 will be described with reference to FIGS. 5 and 6.

The gear shift operation mechanism 70 includes a shift motor 72, a reduction gear mechanism 73, a shift spindle 74, a master arm 75, an intermittently sending mechanism 76, the shift drum 80, a shift fork shaft 90, and the shift fork 91. FIG. 6 shows a structure for changing the speed stage of the transmission mechanism 30. The shift motor 72 provides a rotational driving force, which is reduced by the reduction gear mechanism 73. The reduced rotational driving force rotates the shift spindle 74 and causes the master arm 75 to rotate integrally with the shift spindle 74, thereby making the intermittently sending mechanism 76 intermittently rotate the shift drum 80 to move the shift fork 91. As a result, a target sleeve 61 of the gear switching mechanism 60 is moved in the axial direction to change the speed stage of the transmission mechanism 30.

The shift motor 72 is fixed to the left unit-case cover 28L on the left side of the lower transmission-case half part 22D. The reduction gear mechanism 73 is provided between the lower transmission-case half part 22D and the left unit-case cover 28L. The reduction gear mechanism 73 includes a driving gear 73a, first and second gears 73b and 73c, and a driven gear 73d. The driving gear 73a is integrally formed to a motor shaft 72a of the shift motor 72. The first and second gears 73b and 73c are a large gear and a small gear. The driven gear 73d is fitted to the shift spindle 74.

The shift spindle 74 is rotatably supported by the lower transmission-case half part 22D via the bearings 113, at a part in the vicinity of a left end and at a part in the vicinity of a right end. The master arm 75 is welded to a part in the vicinity of the right end of the shift spindle 74 to make the shift spindle 74 and the master arm 75 integrally rotate.

The shift drum 80 is formed into a hollow cylindrical shape. The shift drum 80 has a right end part and a left end part that are rotatably supported by the lower transmission-case half part 22D respectively via a ball bearing 88 and a needle bearing 89, so as to be parallel to the rotation axis of the crankshaft 23, under the odd-numbered stage shaft 31.

The right end part of the shift drum 80 is provided with the intermittently sending mechanism 76 that intermittently rotates the shift drum 80. The intermittently sending mechanism 76 is connected to the master arm 75 via a pin 76a. The shift drum 80 includes four leading grooves 80a that are provided on a radial outer circumferential surface.

As shown in FIGS. 3 and 5, the shift fork shafts 90 are disposed upward and rearward of the shift drum 80 and are supported by the lower transmission-case half part 22D in parallel to the shift drum 80, while both ends of the shift fork shafts 90 are fitted to the lower transmission-case half part 22D. The shift fork shafts 90 support four shift forks 91 in an individually movable manner in the axial direction.

As shown in FIG. 5, the shift fork 91 includes a base 91a, a fork part 91c, and a pin part 91d. The base 91a is formed with a shaft insertion hole 91b to which the shift fork shaft 90 is inserted. The fork part 91c extends branchingly from the base 91a in a direction perpendicular to the shift fork shaft 90. The pin part 91d is provided at a side opposite to the fork part 91c across the base 91a. The fork part 91c engages with the protrusion 61a, which is formed on the sleeve 61. The pin part 91d engages with a corresponding leading groove 80a, which is formed on the outer circumferential surface of the shift drum 80.

When the shift drum 80 is driven by the shift motor 72 of the gear shift operation mechanism 70 and is thereby rotated, the shift fork 91 is guided by the corresponding leading groove 80a, which is formed on the outer circumferential surface of the shift drum 80, and moves in the axial direction. Thus, the corresponding sleeve 61 is moved in the axial direction, and the speed stage is changed.

Although the sleeve 61 with no shift gear is used in the gear switching mechanism 60 in this embodiment, a shifter gear with a shift gear that is integrally formed to a sleeve may also be used.

As shown in FIG. 3, the transmission T is configured so that a diameter d3 of the idle gear 53 will be greater than a diameter d1 of the transmitting gear 51 and a diameter d2 of the transmitted gear 52. That is, the diameters of the transmitting gear 51 and the transmitted gear 52 are made small, and only the idle gear 53 is a large diameter gear. This structure enables reducing dimensions of the power unit P as viewed from a side, compared with a structure in which the idle gear has a small diameter, and the transmitting gear and the transmitted gear have large diameters.

On the other hand, the transmitting gear 51 and the transmitted gear 52, which respectively have the diameter d1 and the diameter d2 that are smaller than the diameter d3 of the idle gear 53, both have small numbers of teeth. It is difficult to finely adjust the ratio between the transmitting gear 51 and the transmitted gear 52 with such small numbers of teeth.

Figure 10:
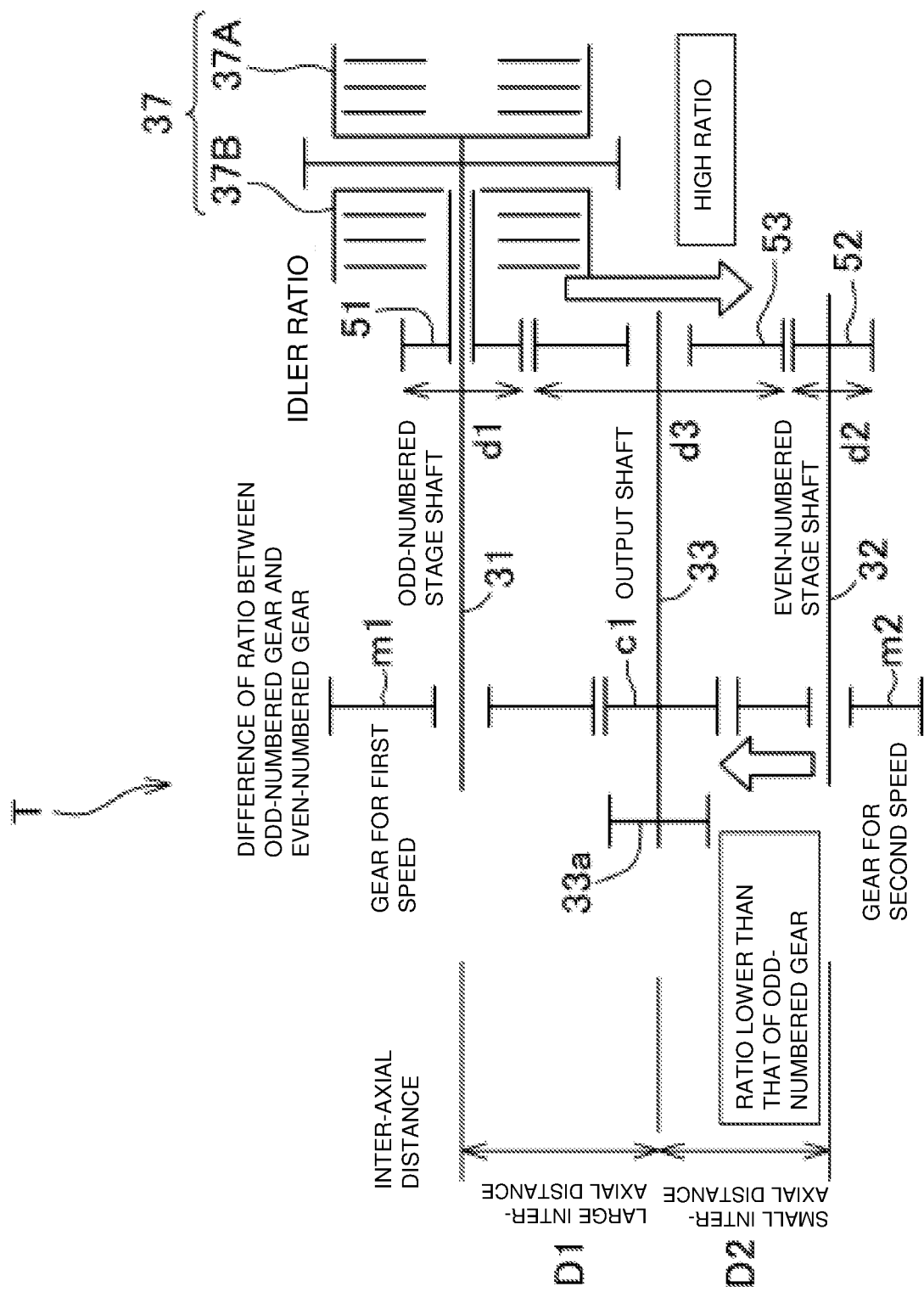
FIG. 10 is a schematic drawing of the transmission.
Figure 11:
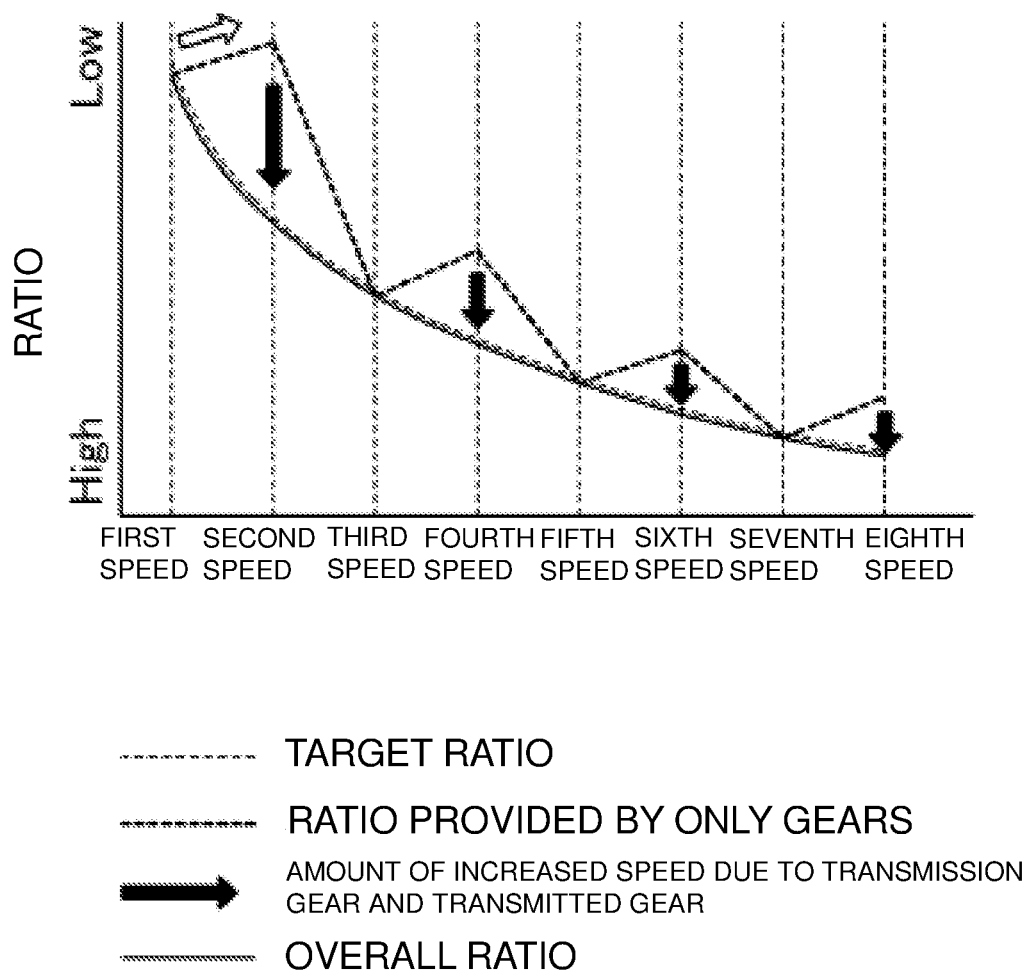
FIG. 11 shows a relationship between a change of speed stage and a ratio of the transmission.

FIG. 10 is a schematic drawing of the transmission T and shows the driving gear m1 for the first speed and the driving gear m2 for the second speed as examples among the driving gears. FIG. 11 shows a ratio for each speed stage. The dashed thin line shows a target ratio. The dashed thick line shows a ratio due to changing of speed only by each of the gears m1 to m8 and c1 to c4. The black arrow shows an amount of increased speed due to the transmitting gear 51 and the transmitted gear 52. The solid line shows an overall ratio obtained by adding the amount of increased speed due to the transmitting gear 51 and the transmitted gear 52 to the ratio of each of the gears m1 to m8 and c1 to c4.

As shown in FIGS. 3 and 10, the odd-numbered stage shaft 31, the even-numbered stage shaft 32, and the output shaft 33 are arranged so that the center distance D1 between the odd-numbered stage shaft 31 and the output shaft 33 will be longer than the center distance D2 between the even-numbered stage shaft 32 and the output shaft 33. That is, the diameter d1 of the transmitting gear 51 is made larger than the diameter d2 of the transmitted gear 52, and thus, the ratio is greatly increased by the transmission from the transmitting gear 51 to the transmitted gear 52. Adjustment of the ratios of the gears m1 to m8 and c1 to c4 are easier than that of the transmitting gear 51 and the transmitted gear 52 because the gears m1 to m8 and c1 to c4 have diameters larger than those of the transmitting gear 51 and the transmitted gear 52. Thus, the ratio of the even-numbered speed stage is finely adjusted to be lower than the ratio of the odd-numbered speed stage to cause a decrease in speed, whereby the target ratio is achieved.

The transmission T of the first embodiment of the present invention is thus structured and thereby has effects as described below.

The present invention solves the above-described problems and provides the transmission T including the rotation shaft 67, the shift gear 66, and the sleeve 61. The shift gear 66 is rotatably supported by the rotation shaft 67. The sleeve 61 is relatively unrotatably supported by the rotation shaft 67 in the movable manner in the axial direction The sleeve 61 is configured to be moved in the axial direction by the shift fork 91 to switch connection and disconnection between the rotation shaft 67 and the shift gear 66, thereby functioning as a gear switching part. The shift fork 91 and the sleeve 61 have the bearing 113, which is composed of the washers 113a and 113b, therebetween. The bearing 113 is disposed in contact with the shift fork 91 and the sleeve 61, thereby reducing friction between the shift fork 91 and the sleeve 61, resulting in improvement of the power transmission efficiency and the durability of the contact surfaces of the shift fork 91 and the sleeve 61.

The transmission T also includes the hub 62, which is relatively unrotatably supported by the rotation shaft 67 while the movement in the axial direction is inhibited, and the blocking ring 63, which is disposed between the shift gear 66 and the sleeve 61. The sleeve 61 is supported by the hub 62 in the movable manner in the axial direction while the relative rotation is inhibited.

The blocking ring 63 has the ring teeth 63t that are disposed between the sleeve teeth 61t of the sleeve 61 and the gear dog teeth 66t of the shift gear 66. The transmission T also includes the synchronizer S that synchronizes the sleeve 61 and the shift gear 66 by bringing the inner circumferential surface 63a of the blocking ring 63 into contact with the protruding cylindrical part 66s of the shift gear 66 in accordance with the movement of the sleeve 61.

In the synchronizing operation of the synchronizer S, when the sleeve teeth 61t of the sleeve 61 push aside the ring teeth 63t of the blocking ring 63 and enter between the gear dog teeth 66t of the shift gear 66, the sleeve 61 receives a rotation force in a direction opposite to the rotation direction of the sleeve 61 due to a reaction force of the shift gear 66. In addition, a relatively great force is required to push the sleeve 61 into the shift gear 66, and this also increases the friction between the shift fork 91 and the sleeve 61. Nevertheless, the transmission T having the synchronizer S with the above-described structure causes less friction between the shift fork 91 and the sleeve 61 in operating the synchronizer S, thereby having an improved durability at the contact surfaces of the shift fork 91 and the sleeve 61.

The washers 113a and 113b that function as the bearing 113 are disposed between the thrust surface 91s of the shift fork 91 and the thrust surface 61s of the sleeve 61. The washer 113a functions as the shift fork-side contact member that is brought into contact with the shift fork 91. The washer 113b functions as the sleeve-side contact member that is brought into contact with the sleeve 61. The washers 113a and 113b are relatively rotatable. This structure further reduces friction between the sleeve 61 and the shift fork 91, thereby improving the durability of the contact surfaces of the sleeve 61 and the shift fork 91.

In more detail, the shift fork 91 is formed with the recessed groove 91e that opens to the sleeve 61, whereas the sleeve 61 is formed with the protrusion 61a that protrudes in the radial direction so as to be inserted into the recessed groove 91e. The washers 113a and 113b that function as the bearing 113 are disposed between the thrust surface 61s of the protrusion 61a of the sleeve 61 and the thrust surface 91s of the recessed groove 91e. The ring-shaped washers 113a and 113b are fitted to the sleeve 61 so that the bearing 113 will be brought into contact with the thrust surface 61s at each side of the protrusion 61a of the sleeve 61, and then, the bearing 113 is inserted into the recessed groove 91e so as to be brought into contact with the thrust surface 91s of the recessed groove 91e of the shift fork 91. Thus, assembling is easy.

Figure 12:
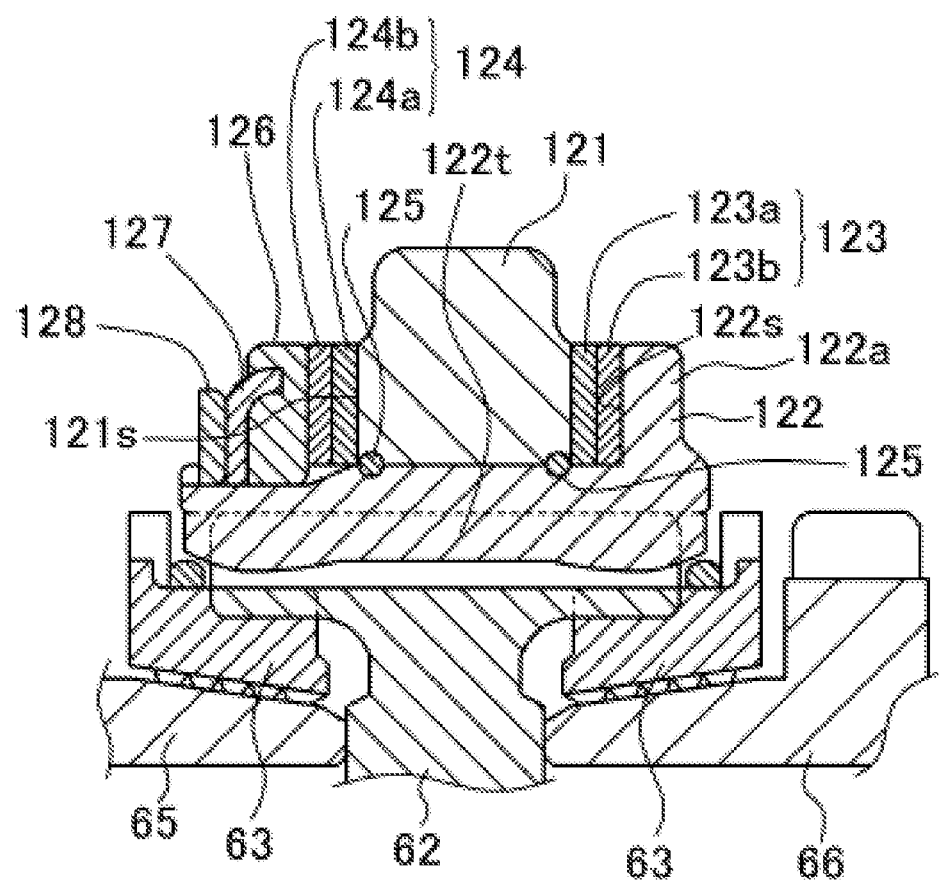
FIG. 12 is a sectional view of the periphery of the gear switching mechanism of the transmission according to a second embodiment of the present invention.

The transmission T of a second embodiment of the present invention will be described with reference to FIG. 12. The transmission T of the second embodiment includes a sleeve 122 that has an open left end at one end part in the axial direction and a right end at the other end part in the axial direction, which is formed with a radially protruding rim 122a.

Washers 123a and 123b that function as a first bearing 123 are disposed so that the first bearing 123 will be brought into contact with the rim 122a. Moreover, washers 124a and 124b that function as a second bearing 124 are disposed on a side opposite to the first bearing 123 across a shift fork 121 in the axial direction.

A retainer 126 is disposed on a side opposite to the shift fork 121 across the second bearing 124 in the axial direction. The retainer 126 inhibits the second bearing 124 from moving away from the shift fork 121 in the axial direction.

The transmission T of the second embodiment is assembled as described below. First, the washer 123b of the first bearing 123 is fitted to the sleeve 122 until the washer 123b is brought into contact with the rim 122a of the sleeve 122, the washer 123a is also fitted to the sleeve 122, and the first bearing 123 is positioned on the sleeve 122 by a positioning ring 125. Moreover, a positioning ring 125 for the second bearing 124 is fitted to a predetermined position on a left side of the sleeve 122, the washers 124a and 124b of the second bearing 124 are sequentially fitted to the sleeve 122, and the retainer 126 is fitted to the sleeve 122 so as to be brought into contact with a left surface of the washer 124b. The retainer 126 is a spline washer with a ring shape. The retainer 126 is fitted to splines in the axial direction on the sleeve 122. The fitted retainer 126 is rotated by one pitch on the grooves of the sleeve 122, to be inhibited from moving in the axial direction. Furthermore, a lock washer 127 is fitted to prevent the retainer 126 from rotating, and a circlip 128 is attached to inhibit the lock washer 127 from moving in the axial direction.

The transmission T of the second embodiment is thus structured and is thereby easily assembled such that the ring-shaped first bearing 123 and the second bearing 124 are arranged on an outer circumference of the sleeve 122 from the open side of the sleeve 122 while the first bearing 123 is brought into contact with the thrust surface 122s of the rim 122a of the sleeve 122.

Figure 13:
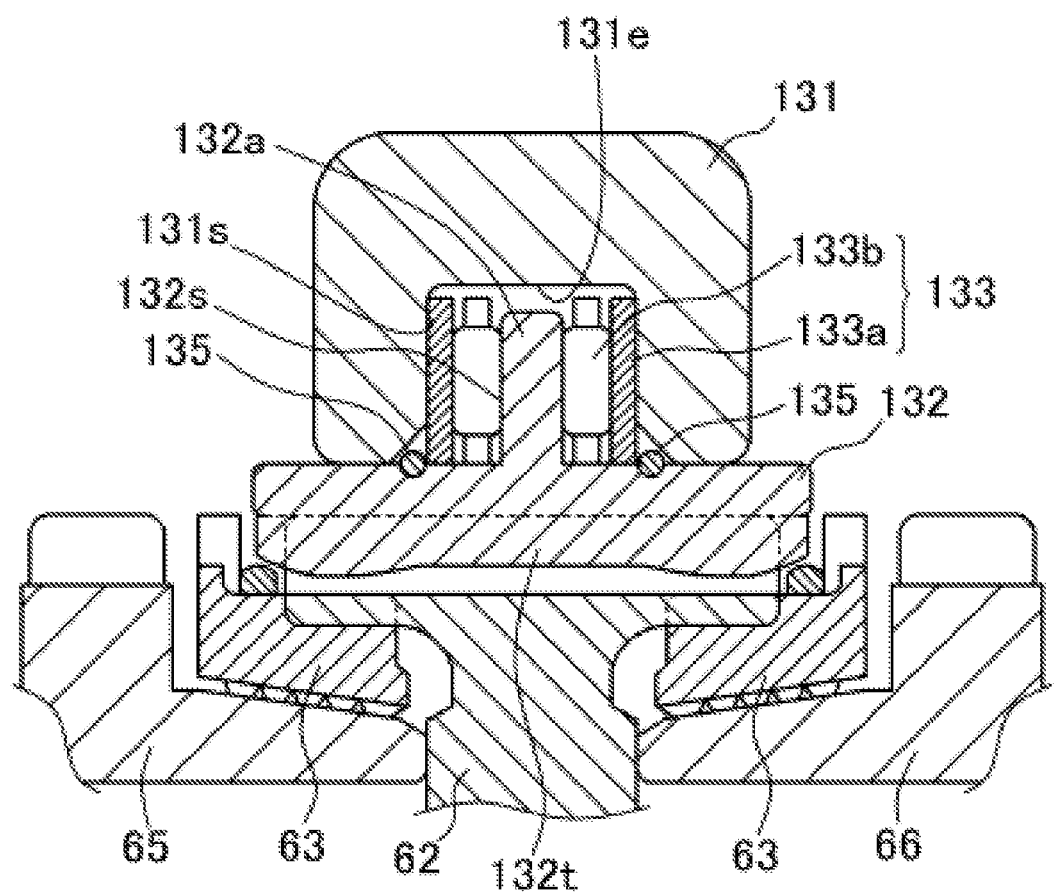
FIG. 13 is a sectional view of the periphery of the gear switching mechanism of the transmission according to a third embodiment of the present invention.

The transmission T of a third embodiment of the present invention will be described with reference to FIG. 13. The transmission T of the third embodiment includes a needle bearing 133b instead of the washer 113b that functions as the sleeve-side contact member of a friction reducing part of the first embodiment.

A shift fork 131 has an inner circumferential surface on which a recessed groove 131e is formed along the circumferential direction. The recessed groove 131e opens to a sleeve 132. The sleeve 132 includes a protrusion 132a having a thrust surface 132s. The recessed groove 131e of the shift fork 131 has a thrust surface 131s. The thrust surface 132s and the thrust surface 131s have a bearing 133 therebetween. The bearing 133 is composed of a washer 133a and the needle bearing 133b. The washer 133a is a shift fork-side contact member that is brought into contact with the shift fork 131, whereas the needle bearing 133b is a sleeve-side contact member that is brought into contact with the sleeve 132.

The needle bearing 133b and the washer 133a are successively fitted to the sleeve 132 so that the bearing 133 will be brought into contact with each side of the protrusion 132a of the sleeve 132. Then, the washer 133a and the needle bearing 133b are positioned by a positioning ring 135 and are inserted into the recessed groove 131e of the shift fork 131. The needle bearing 133b is used as a component of the bearing 133, thereby further reducing friction between the sleeve 132 and the shift fork 131.

Figure 14:
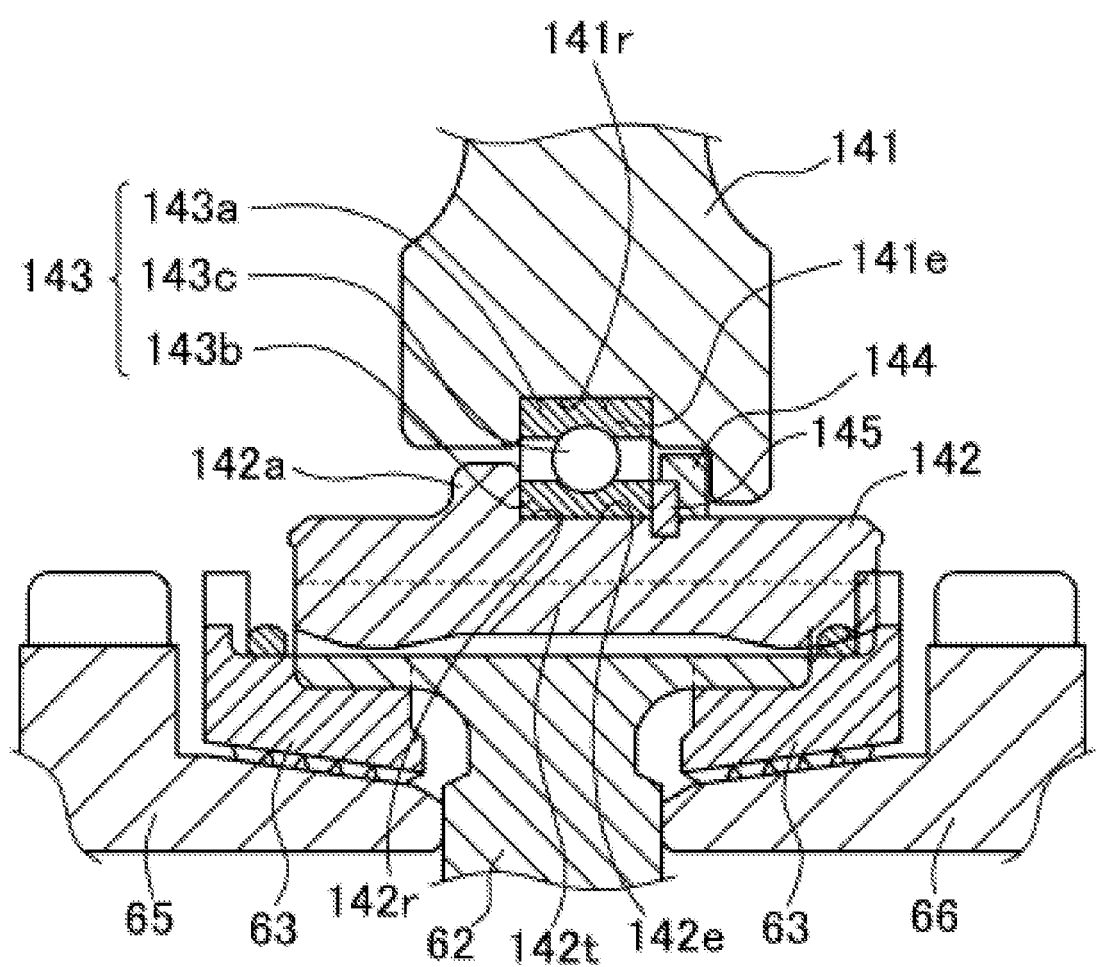
FIG. 14 is a sectional view of the periphery of the gear switching mechanism of the transmission according to a fourth embodiment of the present invention.

The transmission T of a fourth embodiment of the present invention will be described with reference to FIG. 14. In the transmission T of the fourth embodiment, a ball bearing 143 that functions as the bearing of the present invention is disposed between a radial surface 141r of a shift fork 141 and a radial surface 142r of a sleeve 142. The ball bearing 143 is structured by inserting multiple balls 143c between an outer ring 143a and an inner ring 143b.

The shift fork 141 is formed with a fork-side recessed groove 141e that opens to the sleeve 142. The outer ring 143a of the ball bearing 143 that functions as a shift fork-side contact member is fitted into the recessed groove 141e.

The sleeve 142 is formed with a raised part 142a that protrudes in a radial direction. Retainers 144 and 145 are mounted at positions separated from the raised part 142a in the axial direction, whereby the inner ring 143b of the ball bearing 143, which functions as a sleeve-side contact member, is held by the raised part 142a and the retainers 144 and 145.

In the fourth embodiment thus structured, the sleeve 142 is moved in the axial direction by the shift fork 141 primarily via the ball bearing 143, which functions as the bearing of the present invention, whereby the sleeve 142 and the shift fork 141 do not tend to directly slide with each other. Thus, friction between the sleeve 142 and the shift fork 141 is further reduced, resulting in improvement of durability of the contact surfaces of the sleeve 142 and the shift fork 141.

Figure 15:
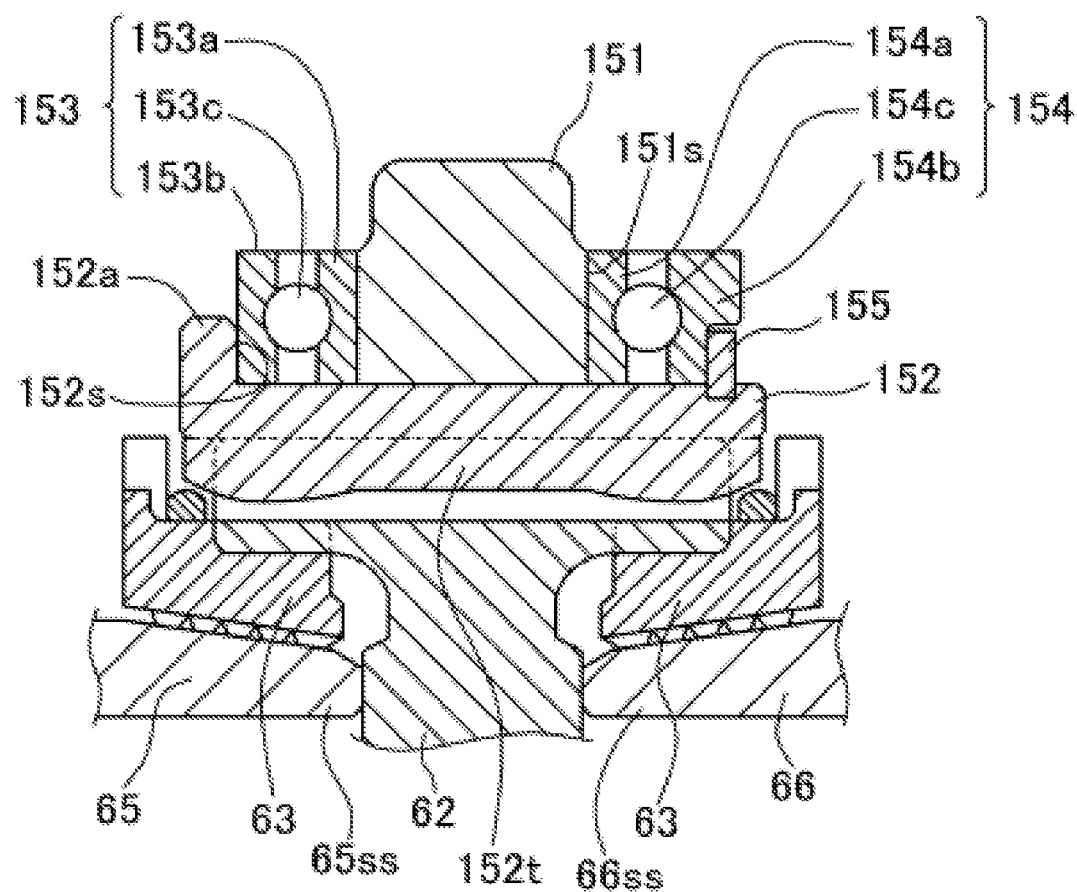
FIG. 15 is a sectional view of the periphery of the gear switching mechanism of the transmission according to a fifth embodiment of the present invention.

The transmission T of a fifth embodiment of the present invention will be described with reference to FIG. 15. The transmission T of the fifth embodiment includes ball bearings 154 and 153 instead of the washers 123 and 124, respectively, which function as the friction reducing parts of the transmission T of the second embodiment.

The transmission T of the fifth embodiment is assembled as described below. First, the ball bearing 153 is fitted as a first bearing to a sleeve 152 until the ball bearing 153 is brought into contact with a rim 152a of the sleeve 152. Further, the ball bearing 154 is fitted as a second bearing to the sleeve 152 and is secured to the sleeve 152 by a retainer 155. The pair of the ball bearings 153 and 154 have a shift fork 151 that is fitted therebetween.

In such a transmission T, the sleeve 152 and the hub 62 are disposed between the shift gears 65 and 66 in the axial direction, and the protruding cylindrical parts 65ss and 66ss of the shift gears 65 and 66 respectively extend toward the hub 62. When the sleeve 152 is at the neutral position in the neutral state as shown in FIG. 15, the ball bearings 153 and 154 that function as the bearings of the present invention are disposed at positions so as to overlap the protruding cylindrical parts 65ss and 66ss, respectively, in the axial direction.

As described above, the shift gears 65 and 66 respectively have the protruding cylindrical parts 65ss and 66ss that extend toward the hub 62, thereby having a space therebetween in the axial direction. Thus, the bearings of the present invention are disposed without thinning the shift fork 151 in such a manner that the bearings 153 and 154 are disposed so as to overlap the protruding cylindrical parts 65ss and 66ss, respectively, in the axial direction.

The above describes the embodiments of the present invention. However, the present invention is by no means limited to the embodiments described above and may undergo various design modifications without departing from the gist of the present invention. Of course, the elements such as the saddled vehicle and the power unit can variously be modified within the scope of the gist of the present invention.

For convenience of explanation, only the embodiments having the structural configuration in the left-right direction as shown in the drawings are described. However, any other embodiments that fall in the scope of the gist of the present invention are also included in the present invention, although having a structural configuration in the left-right direction, which is different from the above-described structural configurations.

REFERENCE SIGNS LIST

T transmission
S synchronizer
61 sleeve
61a protrusion
61t sleeve teeth
61s thrust surface
62 hub
63 blocking ring
63t ring teeth
65 shift gear
65ss protruding cylindrical part
66 shift gear
66ss protruding cylindrical part
66t gear dog teeth
67 rotation shaft
91 shift fork
91e recessed groove
91s thrust surface
111 shift fork
113 bearing
113a washer
113b washer
121 shift fork
121s thrust surface
122 sleeve
122a rim
122t sleeve teeth 122s thrust surface
123 bearing
123a washer
123b washer
126 retainer
131 shift fork
131e recessed groove
131s thrust surface
132 sleeve
132a protrusion
132t sleeve teeth
132s thrust surface
133 bearing
133a washer
133b needle bearing
141 shift fork
141e fork-side recessed groove
141r radial surface
142 sleeve
142r radial surface
142t sleeve teeth
143 ball bearing
143a outer ring
143b inner ring
143c ball
151 shift fork
151s thrust surface
152 sleeve
152a rim
152t sleeve teeth
152s thrust surface
153 ball bearing
153a inner ring
153b outer ring
153c ball
154 ball bearing
154a inner ring
154b outer ring
154c ball
155 retainer

What is claimed is:

1. A transmission comprising:
a rotation shaft;
a shift gear rotatably supported by the rotation shaft; and
a gear switching part relatively unrotatably supported by the rotation shaft in a movable manner in an axial direction, the gear switching part configured to be moved in the axial direction by a shift fork to switch connection and disconnection between the rotation shaft and the shift gear,
wherein a bearing is disposed between the shift fork and the gear switching part in contact with the shift fork and the gear switching part, the bearing comprising:
a first inner bearing member and a first outer bearing member disposed in rotatable relation between the shift fork and the gear switching part on a first side of the shift fork, and
a second inner bearing member and a second outer bearing member disposed in rotatable relation between the shift fork and the gear switching part on a second side of the shift fork,
wherein the first and second inner bearing members comprise washers, and wherein the first and second outer bearing members comprise washers.

2. The transmission according to claim 1, further comprising a synchronizer that includes:
a hub relatively unrotatably supported by the rotation shaft while movement in the axial direction is inhibited;
a sleeve supported by the hub in a movable manner in the axial direction while relative rotation is inhibited; and
a blocking ring disposed between the shift gear and the sleeve, the shift gear having gear dog teeth,
the blocking ring having ring teeth that are disposed between sleeve teeth of the sleeve and the gear dog teeth,
wherein the sleeve is configured to move to make an inner circumferential surface of the blocking ring come into contact with a protruding cylindrical part of the shift gear, whereby the sleeve synchronizes with the shift gear,
wherein the gear switching part uses the sleeve, and
wherein the connection and the disconnection between the rotation shaft and the shift gear are switched by connecting and disconnecting the sleeve teeth of the sleeve to and from the gear dog teeth of the shift gear.

3. The transmission according to claim 2, wherein the bearing is disposed between a thrust surface of the shift fork and a thrust surface of the sleeve,
the bearing includes a shift fork-side contact member and a sleeve-side contact member that are relatively rotatable, the shift fork-side contact member comprises the first outer bearing member and is brought into contact with the shift fork, and the sleeve-side contact member comprises the first inner bearing member and is brought into contact with the sleeve.

4. The transmission according to claim 2, wherein the sleeve has at least one open end in the axial direction.

5. The transmission according to claim 3, wherein the shift fork includes a recessed groove that opens to the sleeve,
the sleeve includes a protrusion that protrudes in a radial direction to be inserted into the recessed groove, and
the bearing is disposed between a thrust surface of the protrusion of the sleeve and a thrust surface of the recessed groove.

6. The transmission according to claim 3, wherein the sleeve includes a rim that protrudes in a radial direction at an end other than the open end,
a first bearing is disposed in contact with the rim,
a second bearing is disposed on a side opposite to the first bearing across the shift fork in the axial direction, and
a retainer is disposed on a side opposite to the shift fork across the second bearing in the axial direction to inhibit the second bearing from moving in the axial direction away from the shift fork.

7. A transmission according to claim 2,
wherein the bearing is disposed between a radial surface of the shift fork and a radial surface of the sleeve, and the bearing includes a shift fork-side contact member, which is brought into contact with the shift fork, and a sleeve-side contact member, which is brought into contact with the sleeve, and
wherein the shift fork-side contact member and the sleeve-side contact member are relatively rotatable.

8. The transmission according to claim 7, wherein the shift fork includes a fork-side recessed groove that opens to the sleeve,
the sleeve includes a raised part that protrudes in a radial direction and retainers that are disposed at positions separated from the raised part in the axial direction,
the shift fork-side contact member is fitted into the fork-side recessed groove, and
the sleeve-side contact member is held by the raised part and the retainers.

9. The transmission according to claim 2, wherein the sleeve and the hub are disposed between shift gears in the axial direction, protruding cylindrical parts of the shift gears extend toward the hub, and when the sleeve is at a neutral position, the bearing is disposed at a position which is further outward, in the axial direction, than an inner end of a corresponding one of the protruding cylindrical parts.

10. The transmission according to claim 3, wherein the sleeve has at least one open end in the axial direction.

11. The transmission according to claim 4, wherein the shift fork includes a recessed groove that opens to the sleeve, the sleeve includes a protrusion that protrudes in a radial direction to be inserted into the recessed groove, and the bearing is disposed between a thrust surface of the protrusion of the sleeve and a thrust surface of the recessed groove.

12. The transmission according to claim 10, wherein the sleeve includes a rim that protrudes in a radial direction at an end other than the open end, a first bearing is disposed in contact with the rim, a second bearing is disposed on a side opposite to the first bearing across the shift fork in the axial direction, and a retainer is disposed on a side opposite to the shift fork across the second bearing in the axial direction to inhibit the second bearing from moving in the axial direction away from the shift fork.

13. The transmission according to claim 3, wherein the sleeve and the hub are disposed between shift gears in the axial direction, protruding cylindrical parts of the shift gears extend toward the hub, and when the sleeve is at a neutral position, the bearing is disposed at a position which is further outward, in the axial direction, than an inner end of a corresponding one of the protruding cylindrical parts.

14. The transmission according to claim 4, wherein the sleeve and the hub are disposed between shift gears in the axial direction, protruding cylindrical parts of the shift gears extend toward the hub, and when the sleeve is at a neutral position, the bearing is disposed at a position which is further outward, in the axial direction, than an inner end of a corresponding one of the protruding cylindrical parts.

15. A transmission comprising:

a rotation shaft;

a shift gear rotatably supported by the rotation shaft; and a gear switching part relatively unrotatably supported by the rotation shaft in a movable manner in an axial direction, the gear switching part configured to be moved in the axial direction by a shift fork to switch connection and disconnection between the rotation shaft and the shift gear, wherein a bearing is disposed between the shift fork and the gear switching part in contact with the shift fork and the gear switching part, the bearing comprising:

a first inner bearing member and a first outer bearing member disposed in rotatable relation between the shift fork and the gear switching part on a first side of the shift fork, and a second inner bearing member and a second outer bearing member disposed in rotatable relation between the shift fork and the gear switching part on a second side of the shift fork, wherein the first and second inner bearing members comprise needle bearings, and wherein the first and second outer bearing members comprise washers.

* * * * *